(12) United States Patent
Trivett

(10) Patent No.: US 11,982,682 B2
(45) Date of Patent: May 14, 2024

(54) PORTABLE FIELD TESTING APPARATUS AND METHOD

(71) Applicant: University of Prince Edward Island, Charlottetown (CA)

(72) Inventor: Andrew Trivett, Stratford (CA)

(73) Assignee: University of Prince Edward Island, Charlottetown (CA)

( * ) Notice: Subject to any disclaimer, the term of this patent is extended or adjusted under 35 U.S.C. 154(b) by 476 days.

(21) Appl. No.: 16/868,085

(22) Filed: May 6, 2020

(65) Prior Publication Data
US 2020/0355715 A1 Nov. 12, 2020

Related U.S. Application Data

(60) Provisional application No. 62/843,928, filed on May 6, 2019.

(51) Int. Cl.
*B01L 3/00* (2006.01)
*G01N 35/10* (2006.01)

(52) U.S. Cl.
CPC .......... *G01N 35/1016* (2013.01); *B01L 3/502* (2013.01); *G01N 35/1095* (2013.01); *B01L 2200/0684* (2013.01); *B01L 2300/087* (2013.01); *B01L 2400/06* (2013.01)

(58) Field of Classification Search
CPC .................. B01L 2300/088; B01L 2300/1822
See application file for complete search history.

(56) References Cited

U.S. PATENT DOCUMENTS

| | | | |
|---|---|---|---|
| 3,532,470 A | 10/1970 | Rochte | |
| 3,690,836 A | 9/1972 | Buissiere | |
| 3,697,227 A | 10/1972 | Goldstein | |
| 3,799,742 A | 3/1974 | Coleman | |
| 4,038,030 A | 7/1977 | Albright | |
| 4,207,394 A | 6/1980 | Aldridge | |
| 4,673,657 A | 6/1987 | Christian | |
| 4,927,265 A | 5/1990 | Brownlee | |
| 6,875,619 B2 | 4/2005 | Blackburn | |
| 8,431,340 B2 | 4/2013 | Jovanovich | |
| 8,697,433 B2 | 4/2014 | Oh | |
| 8,815,521 B2 | 8/2014 | Taylor et al. | |
| 9,101,933 B2 | 8/2015 | Haswell | |
| 9,415,392 B2 | 8/2016 | Ismagilov | |
| 2002/0022261 A1 | 2/2002 | Anderson | |
| 2003/0190608 A1 | 10/2003 | Blackburn | |
| 2003/0224371 A1 | 12/2003 | Thomas et al. | |
| 2005/0226779 A1 | 10/2005 | Oldham | |
| 2006/0228268 A1* | 10/2006 | Heimberg | B01L 7/52 422/130 |
| 2014/0273187 A1 | 9/2014 | Johnson et al. | |
| 2015/0147777 A1 | 5/2015 | Dothie | |
| 2016/0265032 A1 | 9/2016 | Sethi | |
| 2016/0310948 A1 | 10/2016 | Nowakowski | |
| 2018/0304260 A1 | 10/2018 | Thompson | |

OTHER PUBLICATIONS

International Search Report and Written Opinion dated Nov. 18, 2021 PCD/CA2020/050618.

* cited by examiner

*Primary Examiner* — Natalia Levkovich
(74) *Attorney, Agent, or Firm* — Smart & Biggar LP

(57) ABSTRACT

A hand-portable test apparatus includes an in-the-field test processing assembly, and a lab-on-a-chip test cartridge having a neutralising zone, a specific reagent mixing zone, and a testing chamber. It has a convective heating loop for thermal cycling. There are two passive self-actuating valves that allow the test chamber volume to fill with solution, but then close to meter and trap the solution. The apparatus has external illumination ports, and an optical sensing port. Each cartridge is uniquely identified. It has smooth surfaces that allow adhesive membranes to be used to permit the preloading of reagents, prevent evaporation, and permit preservation of results. The test apparatus includes a holder for the cartridge with a heater, illumination, and optical sensor units closely positioned relative to the holder. There is a wiring circuit board, a processor, and a power supply. All of the items are contained within a unitary housing.

23 Claims, 20 Drawing Sheets

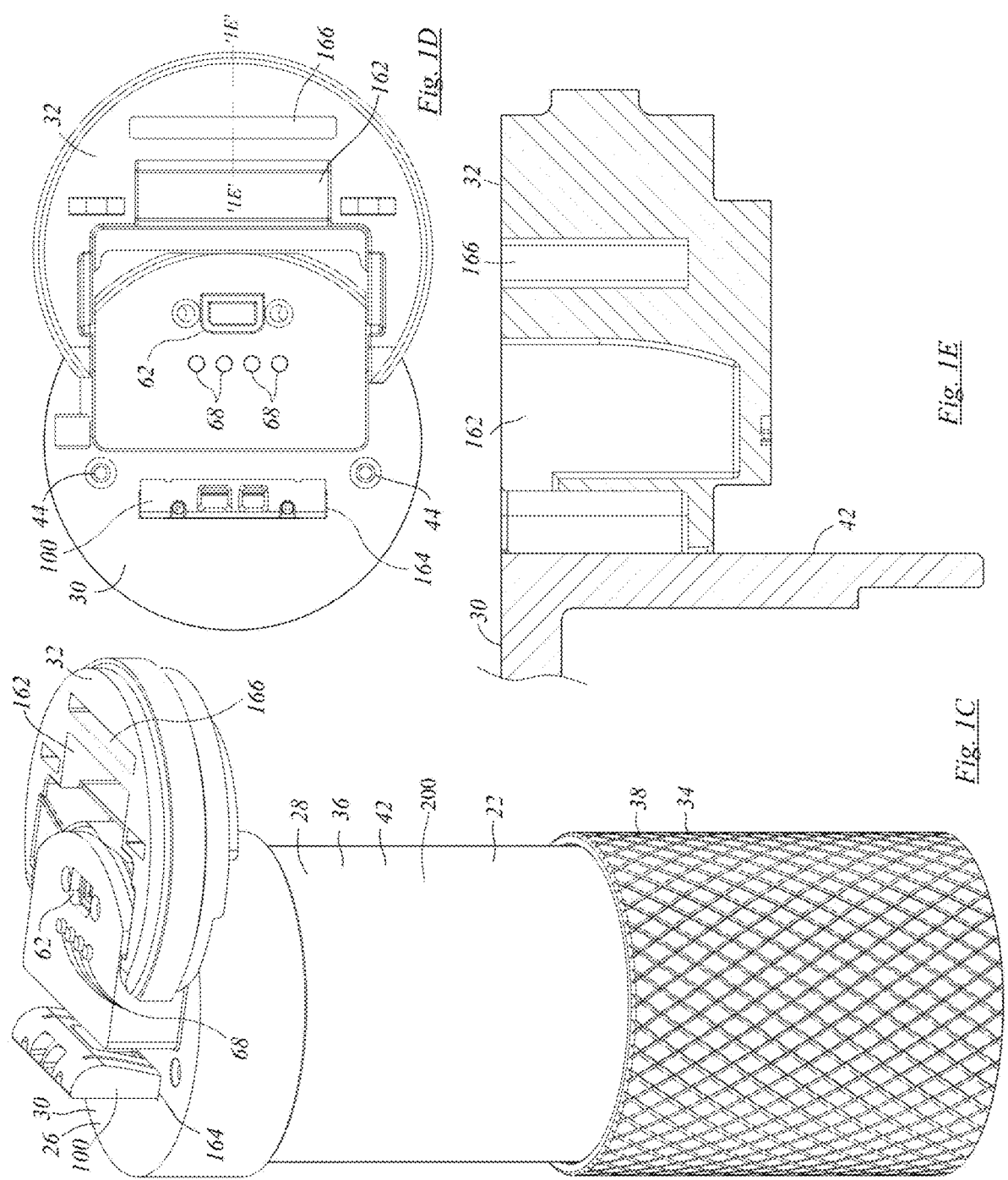

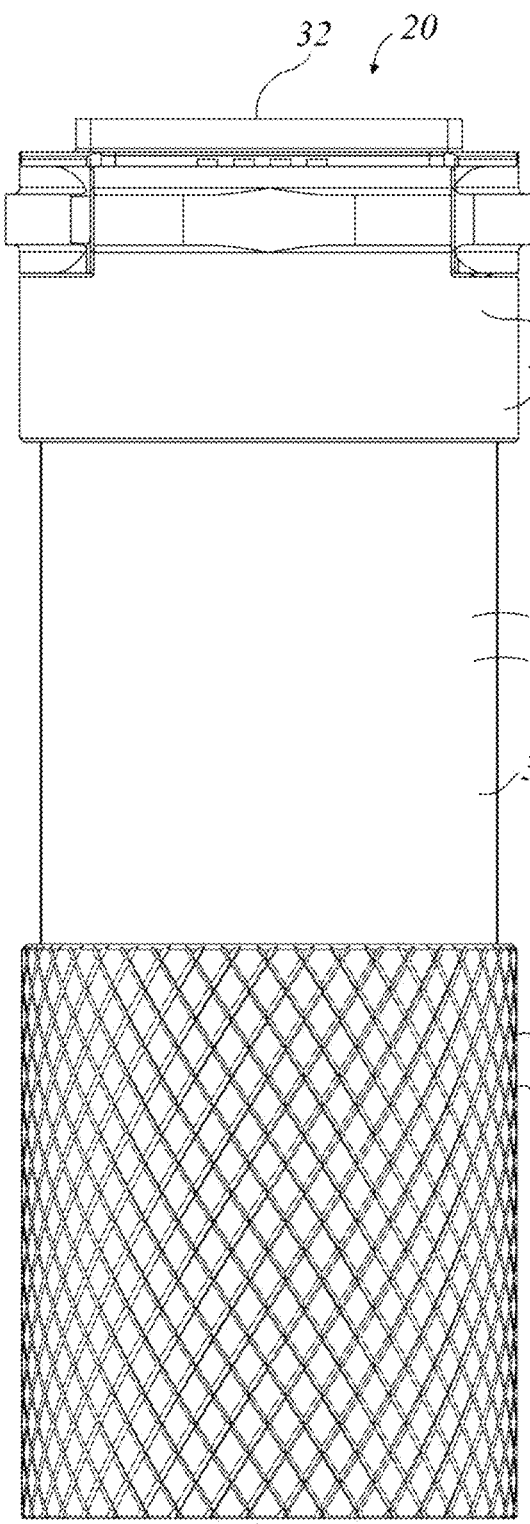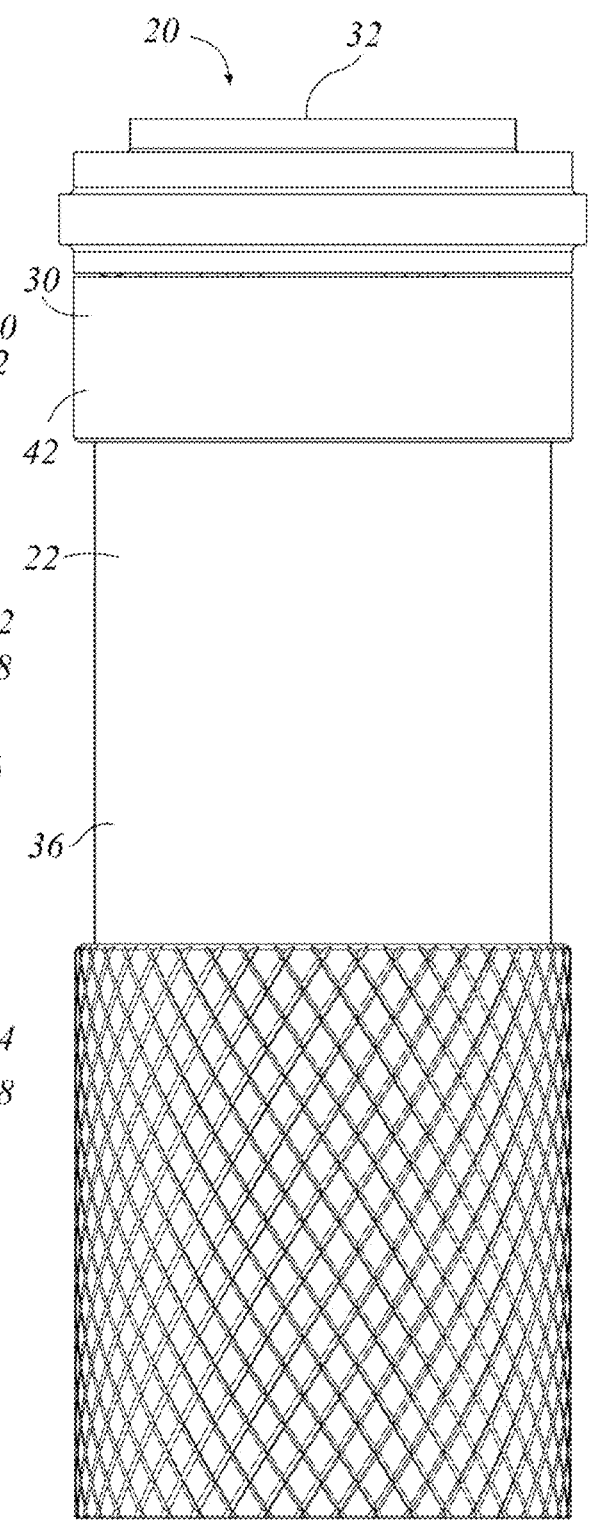
Fig. 2A
Fig. 2B

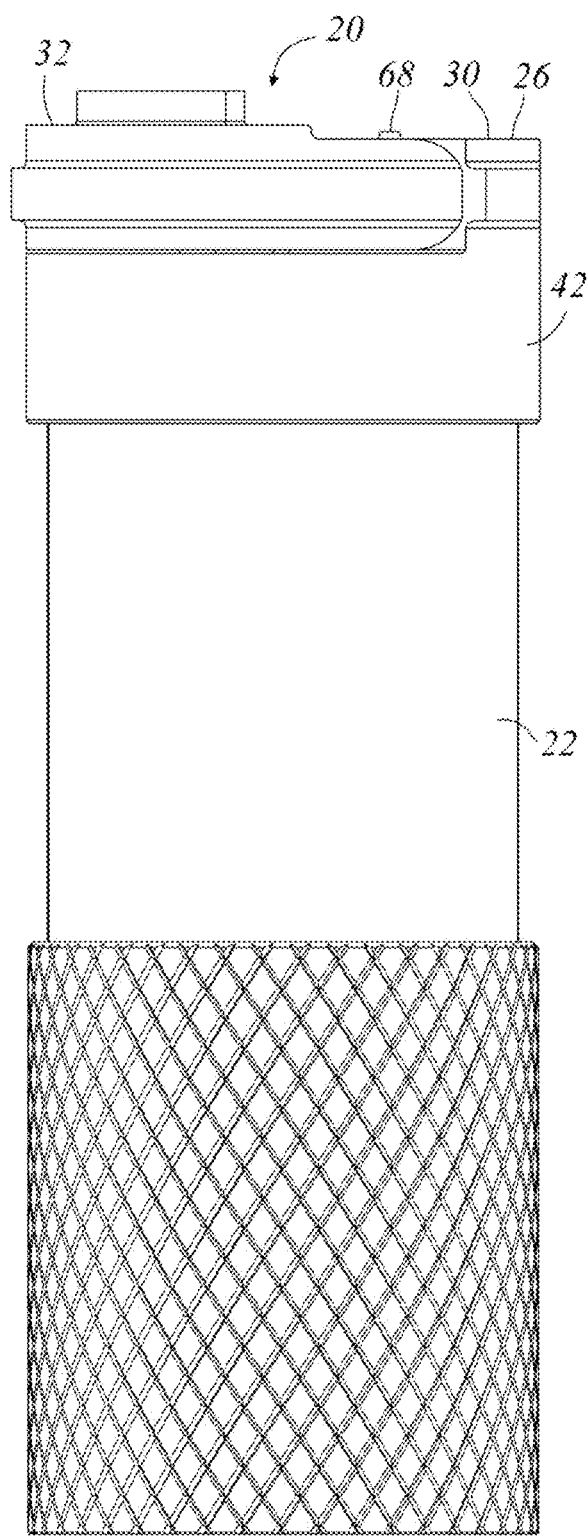
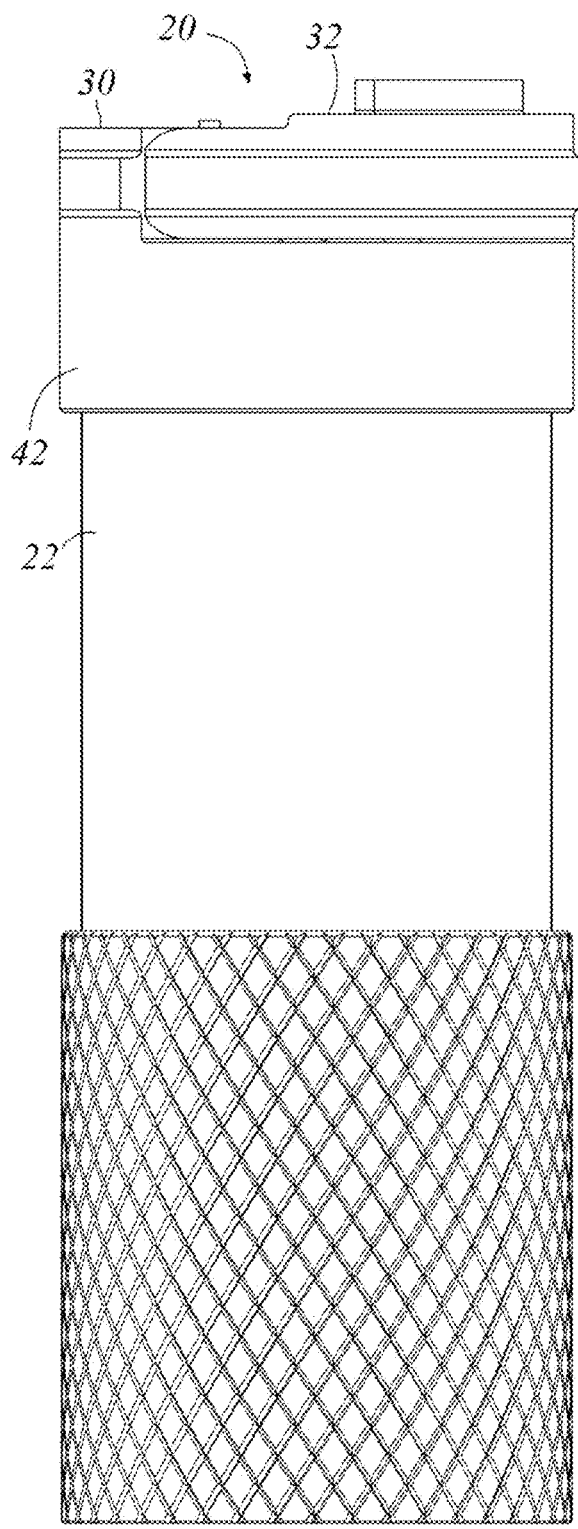
*Fig. 2C*  *Fig. 2D*

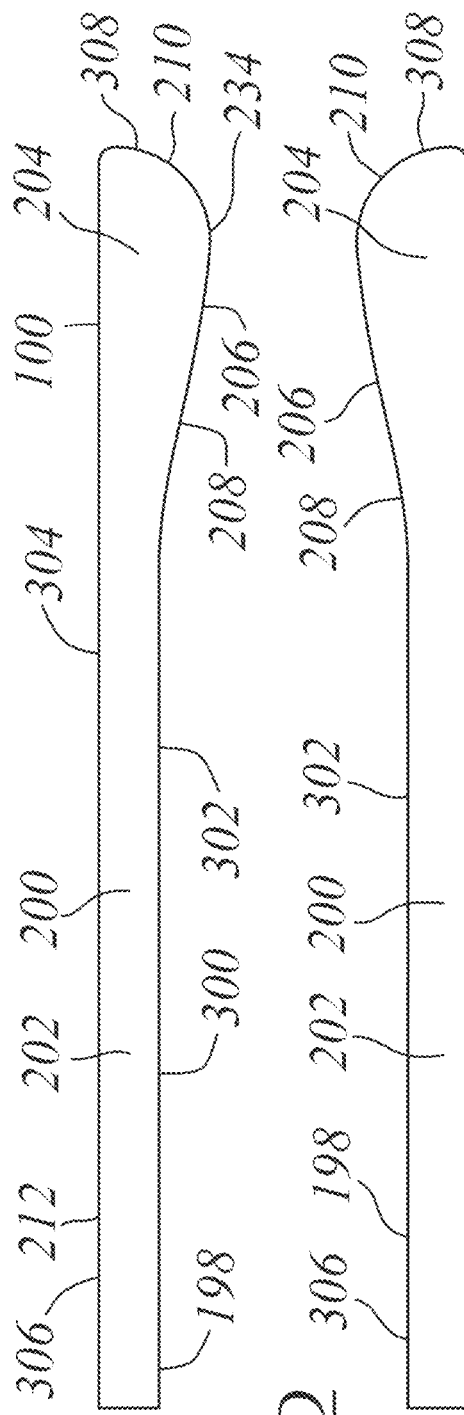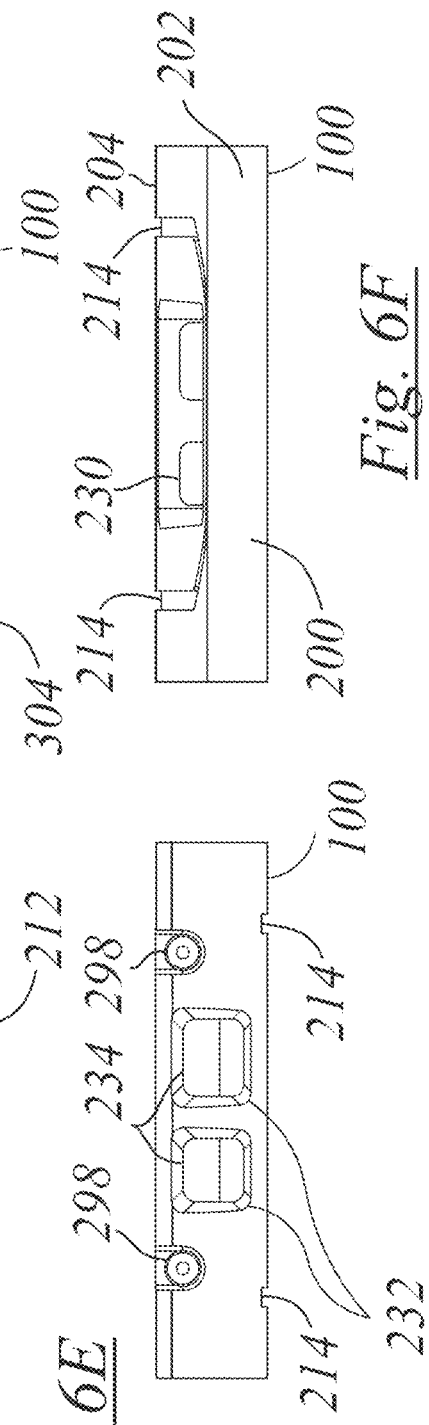

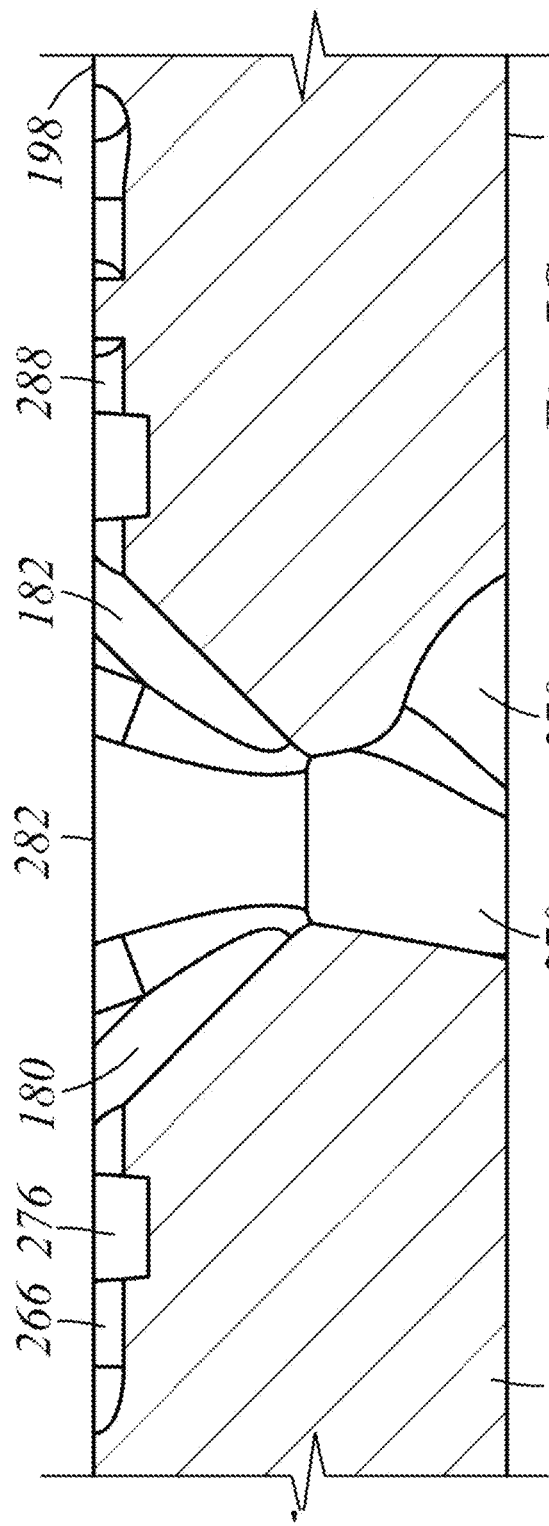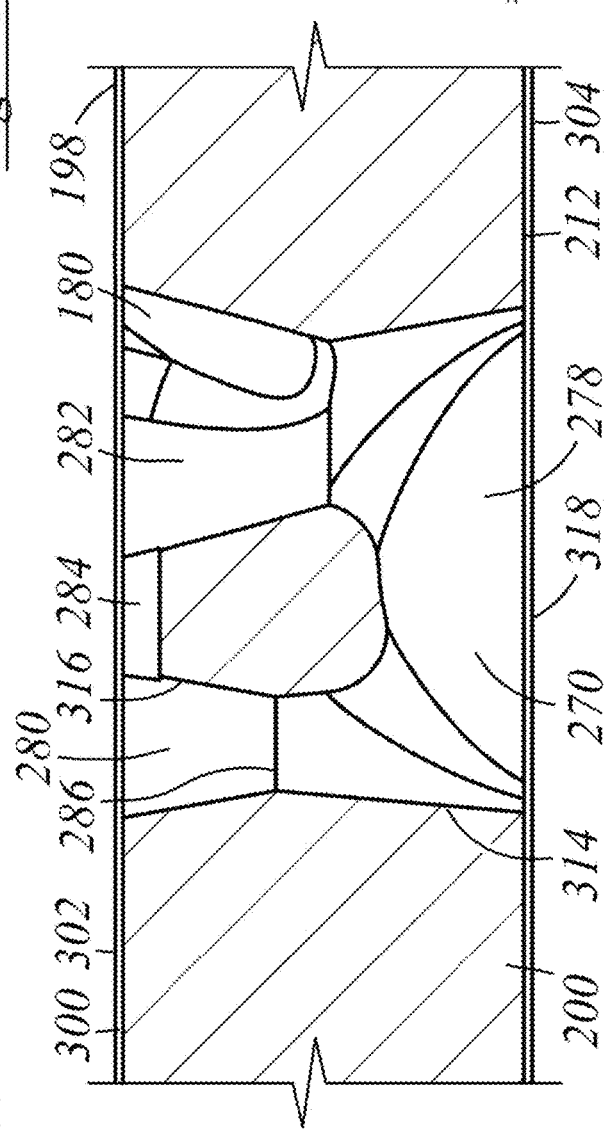

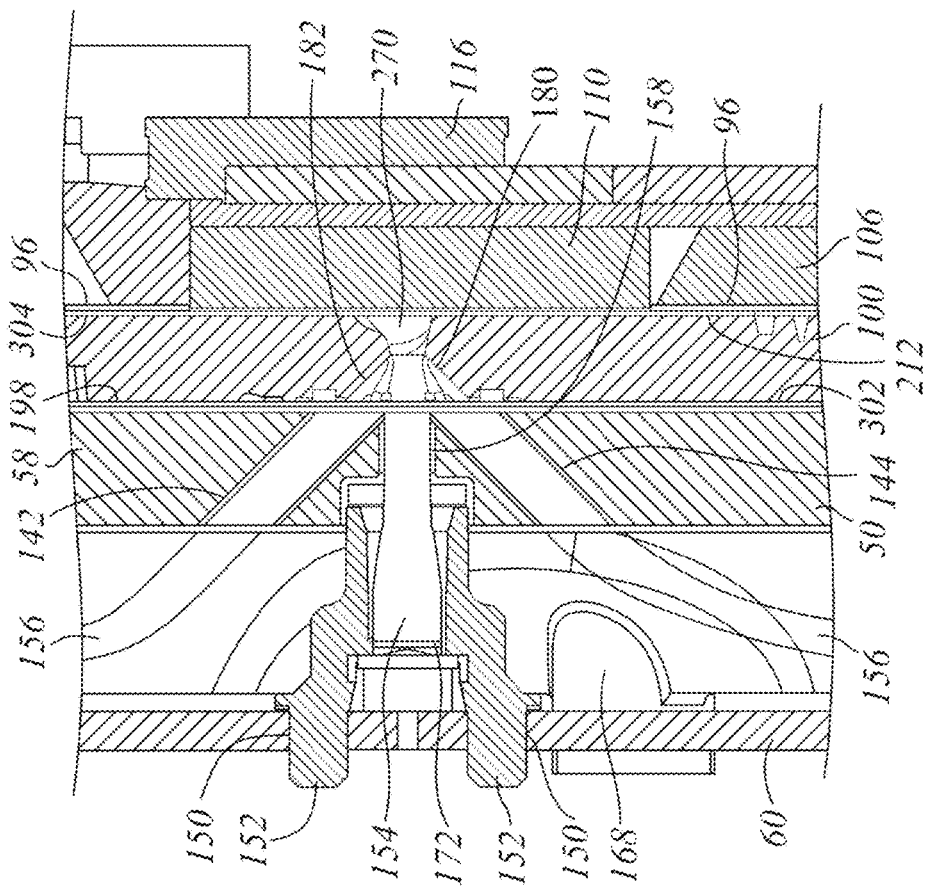
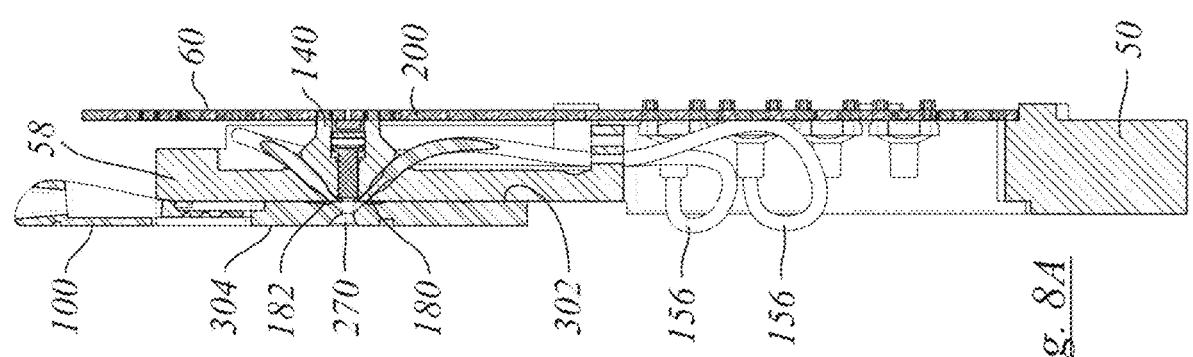
Fig. 8B
Fig. 8A

PORTABLE FIELD TESTING APPARATUS AND METHOD

This application claims the benefit of the priority of U.S. Provisional Patent Application 62/843,928 filed May 6, 2019, the specification and drawings thereof being incorporated in their entirety herein by reference.

FIELD OF THE INVENTION

The present invention relates to the field of diagnostics. More specifically, the present invention relates to portable systems for detecting compounds in field testing.

BACKGROUND

The ability to detect the presence of chemical or biological substances at a non-laboratory location, in a relatively modest period of time can be challenging in many contexts. One such context for detection of chemical or biological compositions, compounds, enzymes, and so on is the ability to detect and identify specific analytes, such as DNA, RNA or proteins in a field setting. Ability to detect specific analytes has substantially changed the fields of environmental monitoring, food safety, agricultural monitoring, diagnostic medicine, and various other fields. Over time, various assays have been developed to detect specific nucleic acid, proteins, small molecules, and microorganisms.

Such assays may require use of an off-site laboratory to process field samples. This can be a slow, expensive, and complex. The delay between taking the sample and producing a result can also limit the value of the tests in some circumstances. For example, when monitoring the spread of an agricultural pest, it may be helpful to have test results promptly, to confirm the identity of the pest and to facilitate timely quarantine decisions to be made to impede further spreading of the pest. Nevertheless, the need for special training to conduct the field test may limit the personnel who can reliably carry them out.

The use of microfluidic devices can in some cases improve throughput and consistency. It may reduce reagent costs. Nevertheless, microfluidic devices may be complex in nature and may have relatively high manufacturing costs. Some microfluidic devices may require complex sample preparation methods, or may require sophisticated training. This may limit them to laboratory settings. For example, many microfluidic devices require the manipulation of strong electric fields or the use of complex micro-scale mechanical actuators, or both, which may add substantial complexity and cost. In some cases, although the samples are small, the testing equipment is quite large. Microfluidic devices are also typically expensive to manufacture and the requirement for specialized equipment often imposes significant capital costs.

It is also helpful to keep accurate records of detection assays, such that data collected from the test may be properly associated with the sample. Depending on the nature of the test, it may also be useful to retain the test sample so that it may be available for subsequent verification at a later date if required. This background is provided for the purpose of establishing context of the invention.

SUMMARY

The invention provides a portable field test tending to facilitate relatively simple, expeditious, and relatively low cost field testing of chemical or biological samples. The field test includes an assay that detects the presence or absence of an analyte, which may be a nucleic acid, a protein, a small molecule, or a microorganism. In some embodiments, the assay may also report the quantity or concentration of the analyte in the sample.

In one aspect, it may be used in a field setting to provide test results in situ, without having to send samples back to a distant laboratory for processing. This may facilitate on-site decision making. In one example, a cartridge designed to detect an agricultural pathogen may permit interim decisions to be made on-site to treat, quarantine, or destroy livestock or crops to discourage the spread of the pathogen. The ability to associate a particular test result to a particular cartridge and to store the cartridge for re-testing at a later date may permit confirmation (or rejection) of interim decisions made to contain such pathogens.

In one aspect, an aqueous sample migrates passively through a cartridge under a gravity head, until it reaches a self-energizing valve or gate, or flow obstruction that automatically closes an air vent when contacted with the liquid. The passive manner in which the sample moves through the cartridge reduces the size, complexity, cost, and power requirements for the cartridge and its reader. In some embodiments, the cartridge may include pre-loaded reagents, which can be calibrated against the inner volume of the cartridge to provide a self-metering reaction.

In an aspect of the invention there is a lab-on-a chip that includes a test chamber having a thermal convection mixing chamber. In a feature of that aspect, the chamber has a recirculation loop. In another aspect, there is a lab on a chip that has internal processing zones or chambers of specific volumetric proportions, and that is provided with pre-loaded reagents, again of specific volumetric proportions such that the volumes of the chambers and reagents limits the volume of the admitted sample for testing and also functions to as a self-metering system to control the proportion of sample to reagents.

In an aspect there is a test cartridge. It has a cartridge body; there is at least a first processing pathway formed in the cartridge body. The processing pathway has an inlet, and at least a first treatment zone in which to combine an input specimen solution and a particular reagent. The particular reagent has a known volume, $V_{R1}$. The processing pathway has a second treatment zone downstream of the first treatment zone. The second treatment zone has a known volume, $V_Z$. The second treatment zone has a processing reagent loaded therein, the processing reagent has a known volume $V_{R2}$.

In a feature of that aspect, the second treatment zone has a vent. The vent has a self-actuating valve. The self-actuating valve has a first state in which the self-actuating valve permits a first substance to leave the second treatment zone through the vent. The self-actuating valve has a second state in which the self-actuating valve obstructs flow through the vent. The self-actuating valve is convertible from the first state to the second state in the presence of a test specimen. The self-actuating valve has a first state permitting a first substance to leave the second treatment zone through the vent. The self-actuating valve has a second state obstructing flow through the vent to prevent escape of material from the second treatment zone. The self-actuating valve is convertible from the first state to the second state in the presence of a test specimen. in another feature, the first treatment zone has a known volume. In another feature, the cartridge is pre-loaded with the particular reagent and the processing reagent, and $V_R$ is less than $V_R$.

In still another feature, the vent is a first vent. The test cartridge includes an inlet well upstream of the first treatment zone. There is a second vent connected to the first treatment zone. The second vent is operable to close before the first vent. The vent is operable to close at a liquid level lower than the second treatment zone. In another feature, there is a buffer chemical pre-loaded in the well upstream of the first treatment zone. In a further feature, the second treatment zone has a heat transfer interface through which, in processing, heat flows to treat materials in the second treatment zone. In another feature, the second treatment zone has a flow loop that includes a recirculation passage, and the flow loop is distant from the heat transfer interface. In still another feature, the cartridge has at least one of: (a) an optical port through which to observe at least a portion of the second treatment zone; and (b) at least one lighting port through which to illuminate at least a portion of the second treatment zone. In another feature, the volumes of at least the first treatment zone, the particular reagent, and the processing reagent are co-ordinated to provide a self-metering function with respect to a sample specimen introduced to the cartridge.

In another aspect there is a test cartridge. It has a cartridge body. At least a first processing pathway is formed in the cartridge body. It has an inlet, and at least a treatment zone in which to process an input specimen solution and a particular reagent. The treatment zone has a heat transfer interface through which to introduce heating from an external source into the treatment zone. The treatment zone has a flow loop that includes a recirculation passage. The heat transfer interface forms at least a portion of an external wall of the cartridge and the recirculation passage is distant from the heat transfer interface.

In a feature, the cartridge has an optical port through which to observe at least a portion of the second treatment zone. In another feature, the cartridge has at least one lighting port through which to illuminate at least a portion of the treatment zone. In a further feature, it has at least one self-activating valve that traps specimen fluid in the test chamber. In another feature, it has a pneumatic thermal lock operable to obstruct egress of test sample from the treatment zone during treatment. In still another feature the treatment zone is a second treatment zone, the cartridge has a first treatment zone upstream of the second treatment zone, the cartridge has a specific amount of a particular reagent pre-loaded in the first treatment zone and a second specific amount a processing reagent pre-loaded in the second treatment zone. The first treatment zone, second treatment zone, and the amounts of the particular reagent and the processing reagent are co-ordinated to provide a self-metering function in respect of a specimen sample introduced to the cartridge. In a yet further feature, the test cartridge has fluidic flow passages arranged in a gravity-driven hierarchy. In still another feature, the test cartridge has at least one peelable accessway covering to permit at least one of (a) at least one pre-loaded reagent; and (b) an aqueous test solution.

In another aspect, there is an apparatus having a portable test cartridge reader and a test cartridge. The test cartridge reader has an accommodation in which removably to receive the test cartridge; a heater; at least a first illumination source; and at least a first optical sensor. The test cartridge has an internal passageway has an inlet and at least one treatment zone. The treatment zone has at least a heat transfer interface that, when the test cartridge is seated in the accommodation, co-operates with the heater. The test cartridge has at least a first optical illumination port that, in use, is positioned to expose the treatment zone to light from the first illumination source. The test cartridge has at least a first optical observation port through which, in use, the optical sensor is exposed to the treatment zone.

In a feature, the treatment zone has a passageway defining a recirculation loop; a first portion of the loop is heated through the heat transfer interface and a second portion of the loop is located away from the heat transfer interface, whereby during treatment differential heating of the first and second portions drives convection heating of material in the treatment zone. In another feature, the test cartridge has self-actuating valving operable to trap treatment material in the treatment zone. In still another feature, the test cartridge has a fluidic circuit formed therein according to a gravitational hierarchy. In another feature, the treatment zone has a specific volume, and the cartridge is provided with a processing reagent that has a volume that is a specific proportion of the volume of the treatment zone, whereby the volume of the treatment zone functions as a self-metering limit governing metering of input specimen volume relative to processing reagent volume. In a further feature, the treatment zone is a second treatment zone and there is another, first, treatment zone upstream of the second treatment zone. In still another feature, a particular reagent is pre-loaded in the second treatment zone and at least one of (a) the second treatment zone; and (b) the particular reagent, is provided in a specific volume relative to volume of the first treatment zone. In another feature, the test cartridge has an entry chamber at which to receive an aqueous test sample, the entry chamber is upstream of the treatment zone, and the entry chamber is pre-provided with a buffer chemical. In another feature, the portable test cartridge reader has a base sized to fit within an automobile cup holder socket. In again another feature, the test cartridge reader includes a processor, a rechargeable battery, an electric heating element of the heater, and an electrical connection. The processor is connected to control operation of the heater, to monitor at least the first optical sensor, and to store and transmit test results. The electrical connection is operable to charge the battery and to provide a communications path for at least output from the processor.

In an aspect of the invention there is a test cartridge. It has a cartridge body. There is at least a first processing pathway formed in the cartridge body. The processing pathway includes an inlet, and at least a first treatment zone. The first treatment zone has an escape or vent. The escape, or vent, has a self-actuating valve downstream of the first treatment zone. The self-actuating valve has a first state in which the self-actuating valve permits a first substance to leave the first treatment zone through the escape or vent. The self-actuating valve has a second state in which the self-actuating valve obstructs flow through the escape or vent. The self-actuating valve is convertible from the first state to the second state in the presence of a test specimen.

In a feature of that aspect, the self-actuating valve is insensitive to the flow of gases and sensitive to the flow of liquids. In another feature, the self-actuating valve change from the first state to the second state in the presence of aqueous liquids. In still another feature, the self-actuating valve is passive. In yet another feature, the self-actuating valve includes an hydrophilic core, and the hydrophilic core swells to obstruct passage of liquids through the valve in the presence of aqueous fluids. In a further feature, in an aspect of the invention there is a test cartridge. It has a cartridge body. There is at least a first processing pathway formed in the cartridge body. The processing pathway includes an inlet, and at least a first treatment zone. The first treatment zone has an escape or vent. The escape, or vent, has a self-actuating valve downstream of the first treatment zone. The self-actuating valve has a first state in which the self-actuating valve permits a first substance to leave the first treatment zone through the escape or vent. The self-actuating valve has a second state in which the self-actuating valve obstructs flow through the escape or vent. The self-actuating valve is convertible from the first state to the second state in the presence of a test specimen.

In a feature, the self-actuating valve is insensitive to the flow of gases and sensitive to flow of liquids. In another feature, the self-actuating valve changes from the first state to the second state in the presence of aqueous liquids. In another feature, the self-actuating valve is passive. In a feature, the self-actuating valve has an hydrophilic core that swells to obstruct passage of liquids through the valve in the presence of aqueous fluids. In a further feature, the at last one flow path defines a trap for aqueous specimens. In a still further feature, the cartridge includes a thermal cycling zone. In another further feature, the flow path includes the first treatment zone and at least a second treatment zone. The first treatment zone is downstream of the inlet. The first treatment zone is a mixing zone. The second treatment zone is downstream of the first mixing zone. The second treatment zone is a thermal cycling zone. In an additional feature the second treatment zone is a heating zone. IN another feature, the cartridge includes a closed loop path, and the closed loop path is a thermal cycling convective loop. In still another feature, the convective loop includes a heating chamber and a return. The return has an inlet connected to a flue of the heating chamber, and an outlet connected a base of the heating chamber.

In another feature, the test cartridge has a first treatment zone, a second treatment zone, and a third treatment zone. In an additional feature, the first treatment zone is a neutralizing zone. The second treatment zone is a mixing zone. The third treatment zone is a thermal treatment zone. In a further feature the neutralizing zone has a generic pre-loaded neutralizing agent. In still further feature, the third treatment zone has a pre-loaded marker. In still another feature, the second treatment zone has a test-specific agent pre-loaded therein. In yet another feature, any one of the three treatment zones has a reagent pre-loading port. The reagent pre-loading port is re-sealable. In another feature, the first treatment zone has a first escape and a first self-activating valve controls flow through the first escape. The third treatment zone has a second escape, and a second self-activating valve controls flow through the second escape. In still another feature, the test cartridge has an optical sensing port. In a yet further feature the test cartridge has at least one optical illumination port. In another feature, the test cartridge is gravity head driven. In a further feature, each test chamber is of a known volume. In still another feature, the body of the cartridge has at least a continuous surface, and the first flow path is sealed on one side be a membrane applied to the continuous surface. In another feature, the body has a top end and a bottom end. The entry is at the top end. The entry is closed by a sealable membrane. In a still further feature, the top end of the cartridge is bulbous and has a form of continuous slope continuity. In yet another feature, the test cartridge has at least a second flow path. The first flow path is pre-loaded with a first reagent for testing. The second flow path is pre-loaded with a second reagent for testing. In a further feature, the flow path has a heat sensitive valve operable to lock a test sample in one the treatment zone. In a still further feature, the heat sensitive valve is a pneumatic valve, and the pneumatic valve has an air reservoir.

In yet another feature, the cartridge is gravity driven. The test cartridge has a top end and a bottom end. The test cartridge has a first treatment zone, a second treatment zone and a third treatment zone. The first treatment zone has a pre-loaded neutralising reagent. The first treatment zone has a vent. Flow through the vent is controlled by a first self-activating valve. The second treatment zone has a pre-loaded testing agent. The third treatment third treatment zone has a third pre-loaded reagent. The third pre-loaded reagent is a colour-changing optical marker. The third treatment zone is a thermal cycling zone. The body has at least one illumination port through which to illuminate at least a portion of the third treatment zone. The body has at least one optical sensing portion through which to observe the illuminated portion of the third treatment zone. The third treatment zone has a convection loop. The third treatment zone has a heater interface through which a portion of the convection loop is heated. The third treatment zone has a second escape, flow through the second escape is governed by a second self-actuating valve. The second self actuating valve including a core that swells in the presence of aqueous fluids. In still another feature, the first treatment zone has a first known volume. The second treatment zone has a second known volume. The third treatment zone has a third known volume. The body has the flow path formed therein and the first flow path is sealed by at least first and second membranes applied to opposed faces of the body.

In another aspect there is a portable test apparatus. It has a test cartridge holder. There is a thermal treatment unit located to heat at least a portion of a test cartridge seated in the test cartridge holder. At least one sample illuminator positioned to illuminate at least a portion of the test cartridge set in the test cartridge holder. At least one optical sensor co-operable with the sample illuminator. A reader is connected to receive output from the at least one optical sensor.

In a feature of that aspect, the portable test apparatus includes the test cartridge. In another feature, the test cartridge has any combination of the features of the foregoing aspect and features related above. In another feature, the reader includes a transmitter unit operable to send observations from the at least one optical sensor to a processor. In still another feature, the reader includes a receiver operable to convey operating instructions to the heater. In a further feature the reader includes a processor operable to control the heater and operable to monitor observations from the at least one optical sensor. In another feature, the reader includes a power supply. In still another feature, the apparatus includes a housing has a cover movable between a closed position and an open position to govern access to the cartridge holder. In still another feature, the cover, in the closed position, encloses the cartridge and forms a light barrier. In yet another feature, the housing contains all of the test apparatus and provides a base upon which to stand the test apparatus when in use.

In another aspect of the invention, there is an apparatus for identifying the presence or absence of a target molecule in a sample. The apparatus has a cartridge for receiving the sample. The cartridge has a first chamber for mixing a first reagent with the sample to produce a first mixture. There is a second chamber in fluid communication with the first chamber. The second chamber is configured for mixing a second reagent with the first mixture to produce a second mixture. There is a third chamber in fluid communication with the second chamber, the third chamber configured for mixing a third reagent with the second mixture to produce a third mixture. There is a reader for receiving the cartridge. There is an activation element for initiating a detection assay in third chamber. There is a light source for illuminating the third chamber. There is an optical sensor for measuring the detection assay.

In another aspect there is a cartridge for identifying the presence or absence of a target molecule in a sample. The cartridge has a first chamber for mixing a first reagent with the sample to produce a first mixture. There is a second chamber in fluid communication with the first chamber. The second chamber is configured for mixing a second reagent with the first mixture to produce a second mixture. There is a third chamber in fluid communication with the second chamber. The third chamber configured for mixing a third reagent with the second mixture to produce a third mixture.

In another aspect, there is a reader for identifying the presence or absence of a target molecule in a sample. The reader has a cartridge holder for receiving a cartridge containing the sample. There is an activation element for initiating a detection assay in a chamber of the cartridge. There is a light source for illuminating the chamber in the cartridge. There is an optical sensor for measuring the detection assay.

In still another aspect there is a microfluidics cartridge for analyzing a sample. The cartridge has a first chamber for mixing a first reagent with the sample to produce a first mixture. There is at least one further chamber in fluid communication with the first chamber. There is at least one further chamber for mixing the first mixture with at least one further reagent to produce at least one further mixture. There is an air reservoir disposed on the fluid communication between the second chamber and the third chamber, such that when heated, expanding air within the air reservoir breaks the fluid communication between the second chamber and the third chamber.

In a feature of any of the foregoing aspects, in use, the cartridge is oriented such that the first chamber is above the second chamber and the third chamber, so as to generate a gravity head to encourage fluid flow toward the third chamber. In another feature, the cartridge has an air vent. It has a swellable plug configured to expand when contacted with the third mixture, thereby occluding the air vent and preventing further migration of the third mixture. In an additional feature, the swellable plug is configured to continue absorbing the third mixture after the assay is initiated. In another additional feature, the cartridge can be stored and the swellable plug can be analyzed after storage to confirm the presence or absence of the target molecule in the sample. In still another feature, the cartridge comprises a second air vent. It has a second swellable plug configured to expand when contacted with the second mixture, thereby occluding the second air vent. In an additional feature, the cartridge has an air reservoir disposed on the fluid communication line between the second chamber and the third chamber, such that when heated, expanding air within the air reservoir breaks the fluid communication between the second chamber and the third chamber.

In another feature, the third chamber is configured to convectively mix the third reagent and the second mixture when the third chamber is heated. In another feature, heat is applied to a lower portion of the third chamber and the third chamber comprises an elbow portion linking the lower portion with an upper portion of the third chamber. In still another feature, the elbow portion is configured to store the third reagent, prior to introduction of the sample. In yet another feature, the second chamber has a raised portion for storing the second reagent, prior to introduction of the sample. In a further feature, at least one wall of the second chamber is a flexible film and the raised portion further comprises a series of supports to maintain a distance between the film and the raised portion.

In another feature, the light source outputs a first peak wavelength and the optical sensor measures the detection assay by detecting fluorescence from the third mixture, in response to the light source. In an additional feature, the optical sensor comprises an optical filter configured to permit passage of light at a second peak wavelength. In another feature, the reader further comprises a second light source at the second peak wavelength. In a still further feature, the reader has a processor and, upon activation of the second light source, the optical sensor generates a signal value. The processor compares the signal to a pre-determined range. A fault is indicated by the reader if the signal value is above or below the pre-determined range. In another feature, the reader has a processor. Upon activation of the first light source, the optical sensor generates a first signal value. Upon activation of the second light source the optical sensor generates a second signal value. The processor compares a difference between the first signal and the second signal to a pre-determined range, and a fault is indicated by the reader if the difference is above or below the pre-determined range. In another feature, the optical sensor measures the detection assay by detecting the turbidity of the third mixture.

In still yet another feature, the reader further has a processor for recording and storing a result of the assay, the cartridge is labelled with a unique identifier, and the processor associates the result with the unique identifier. In another feature, the unique identifier is a radio-frequency identification (RFID) tag and the reader includes an RFID reader for reading the RFID tag. In an additional feature, the unique identifier is a bar code and the reader includes a bar code reader for reading the bar code. In another feature, a user of the apparatus inputs the unique identifier manually into the reader. In still another feature, the activation element heats the third chamber to a pre-determined temperature.

In another feature, the target molecule is a nucleic acid and the assay comprises a Loop-mediated isothermal amplification (LAMP) reaction. In an additional feature, the LAMP reaction is a real-time LAMP reaction. In another additional feature, the apparatus is configured to determine the quantity of the nucleic acid in the sample. In a further feature, the activation element thermocycles the third chamber between two or more pre-determined temperatures. In another feature, the target molecule is a nucleic acid and the assay comprises a polymerase chain (PCR) reaction. In still yet another feature, the PCR reaction is a real-time PCR reaction. In a further feature, the apparatus is configured to determine the quantity of the nucleic acid in the sample.

In another aspect of the invention, there is a microfluidics cartridge for analyzing a sample. It has a cartridge. The cartridge has a first chamber for mixing a first reagent with the sample to produce a first mixture. There is at least one further chamber in fluid communication with the first chamber in which to mix the first mixture with at least one further reagent to produce at least one further mixture. There is an air vent. It has a swellable plug configured to expand when contacted with the at least one further mixture, thereby to occlude the air vent and to prevent further migration of the at least one further mixture within the cartridge.

In a feature of that aspect the cartridge is configured such that, when oriented vertically, the first chamber is positioned above the at least one further chamber so as to generate a gravity head to encourage fluid flow toward the at least one further chamber. In another feature, the swellable plug is configured to continue absorbing the at least one further mixture after the vent is occluded. In a further feature, the cartridge can be stored and the swellable plug can be analyzed after storage to confirm the presence or absence of the target molecule in the sample.

In another aspect there is a method of identifying the presence or absence of a target molecule in a sample. The method includes orienting a cartridge such that a first chamber within the cartridge is above at least one further chamber within the cartridge. The first chamber is in fluid communication with the at least one further chamber. The method further includes loading the sample into the cartridge, and contacting the sample with a first reagent in the first chamber to produce a first mixture. It includes allowing the first mixture to flow under gravity from the first chamber to the at least one further chamber, and contacting the first mixture with at least one further reagent to produce at least one further mixture. The further mixture is directed to a third chamber. The method includes contacting a self-activating outlet valve of the third chamber with the further mixture, causing the further mixture to be trapped in the third chamber, thereby preventing further migration of the at least one further mixture.

In a feature, the method includes heating the further mixture. In another feature, the method includes illuminating at least a portion of the mixture. In a further feature, the method includes employing doping the further mixture with a colour-changing marker. In an additional feature, the method includes doping the further mixture with a fluorescing die marker. In another feature the method includes using an optical sensor to monitor the further mixture for colour change consequent on treatment thereof. In still another feature, the method includes using a heat activated valve to lock the further mixture in the test chamber. In another feature, the method includes recording an RFID tag specific to the cartridge. In a further feature, the method includes storing the cartridge after use to preserve the test result.

In another aspect there is a method of using any cartridge shown, described or claimed herein. The method includes pre-loading a first reagent in any test zone of the cartridge; storing the cartridge; pre-loading the cartridge with a second reagent in any other test zone of the cartridge at a later time closer to use of the cartridge to test a sample.

In a feature of that aspect, the second reagent is specific to a particular disease to be detected. In another feature, the second reagent has a shorter shelf life than the first reagent. In another feature, the method includes sealing a membrane over an access to the test zone of the first reagent. In still another feature, the method includes sealing a membrane over an access of the test zone of the second reagent. In another feature, the method includes trapping a test sample in a test chamber. In another feature, the method includes trapping the test sample in a test chamber using a self-activating valve. In still another feature, the method includes sealing an entry port of the cartridge to prevent evaporation. In another feature, a pneumatic valve is used to isolate the test sample during treatment. In a further feature, the method includes thermal cycling of the test sample. In a still further feature, the method includes illumination and optically monitoring at least a portion of the test sample. In another feature, the method includes passing at least a portion of the test sample through a convective thermal treatment loop.

BRIEF DESCRIPTION OF THE DRAWINGS

These and further and other aspects and features of the invention may be understood with the aid of the illustrative drawing Figures in which:

FIG. 1C is an isometric view of the apparatus of FIG. 1A in which the access cap or lid has been opened;

FIG. 1D is a top view or the apparatus of FIG. 1C;

FIG. 1E is a view on section '1E-1E' of FIG. 1D;

FIG. 2A is a front view of the apparatus of FIG. 1A;

FIG. 2B is rear view of the apparatus of FIG. 2A;

FIG. 2C is a left-hand side view of the apparatus of FIG. 2A;

FIG. 2D is a right-hand side view of the apparatus of FIG. 2A;

FIG. 6C is a right side view of the cartridge of FIG. 6A;

FIG. 6D is a left side view of the cartridge of FIG. 6A;

FIG. 6E is a top view of the cartridge of FIG. 6A;

FIG. 6F is a bottom view of the cartridge of FIG. 6A;

FIG. 7C is a section of the cartridge on section '7C-7C' of FIG. 7A;

FIG. 7D is a section of the cartridge on section '7D-7D' of FIG. 7A;

FIG. 8A is a side view in section of the cartridge and an optical sensor assembly of the apparatus of FIG. 1A, showing relative positioning with apparatus structure removed for clarity; and FIG. 8B is an enlarged sectional detail of the apparatus of FIG. 8A, with all elements of structure to show relative positioning of the elements in use.

DETAILED DESCRIPTION

Figures 1A, 1B:
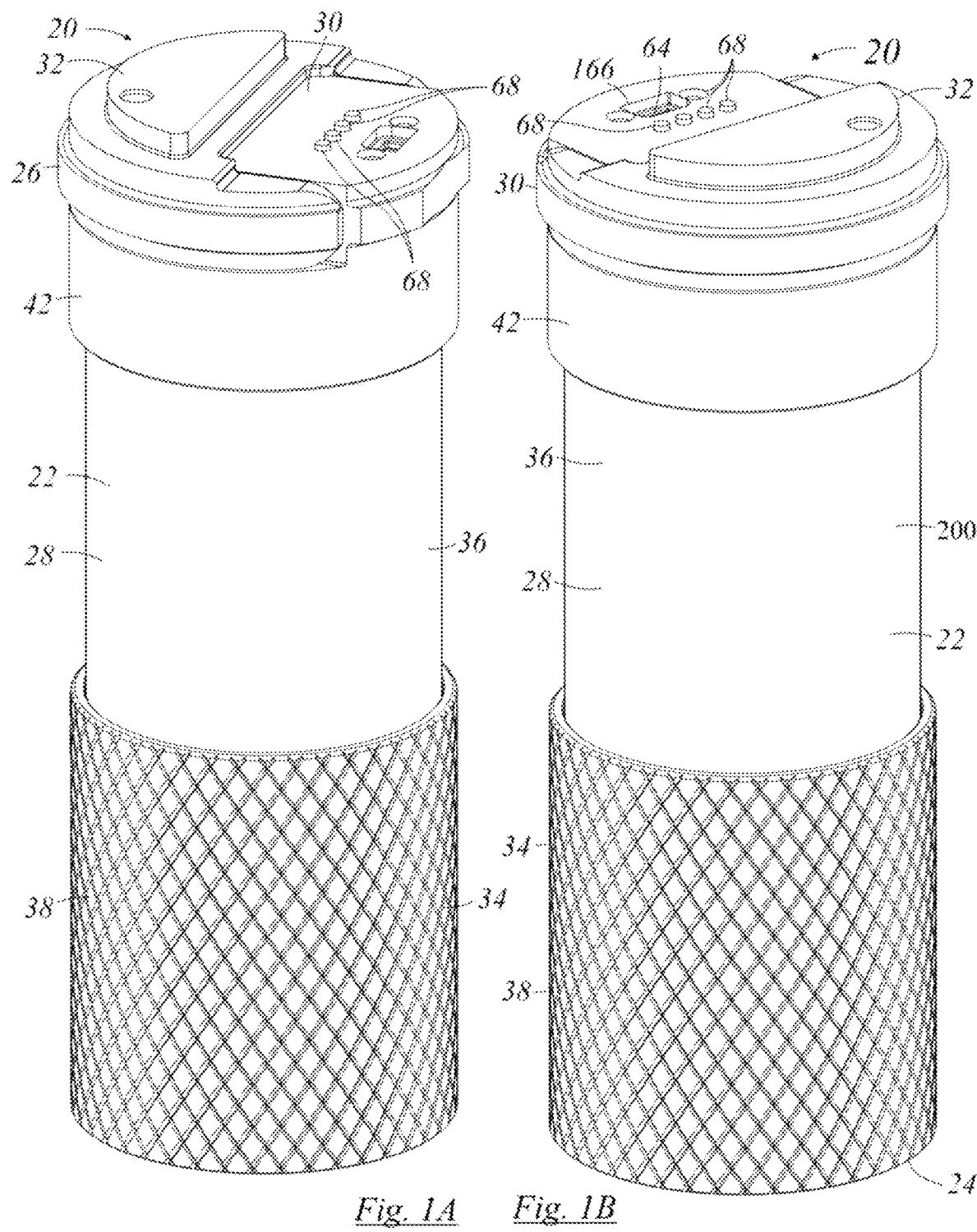
FIG. 1A is an isometric general arrangement view of an apparatus as described herein conforming to the invention.
FIG. 1B is an isometric view of the apparatus of FIG. 1A from an opposite view.
Figure 2E:
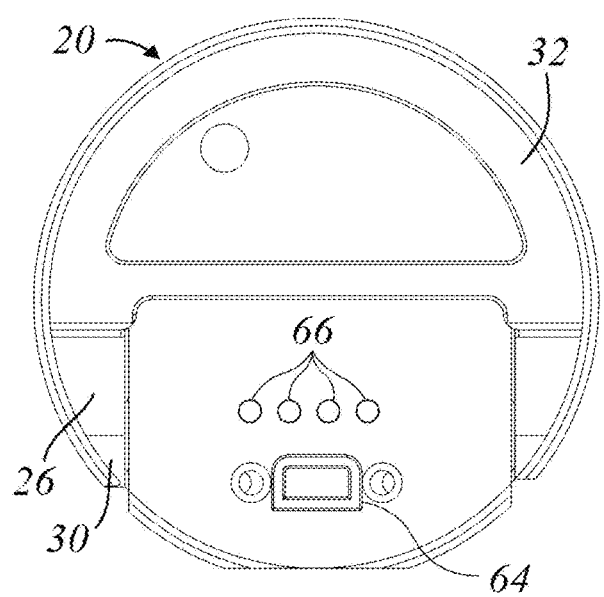
FIG. 2E is a top view of the apparatus of FIG. 2A.
Figure 2G:
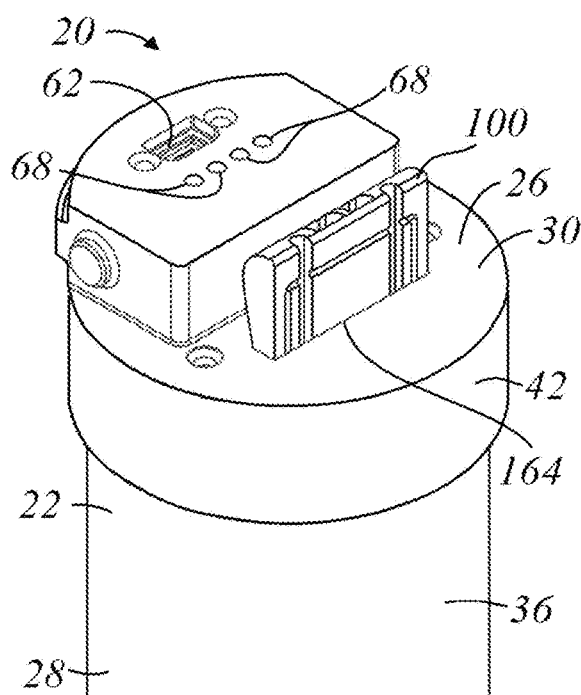
FIG. 2G is a perspective view of the apparatus of FIG. 2A shown with movable cap removed and test cartridge partially protruding.
Figure 2F:
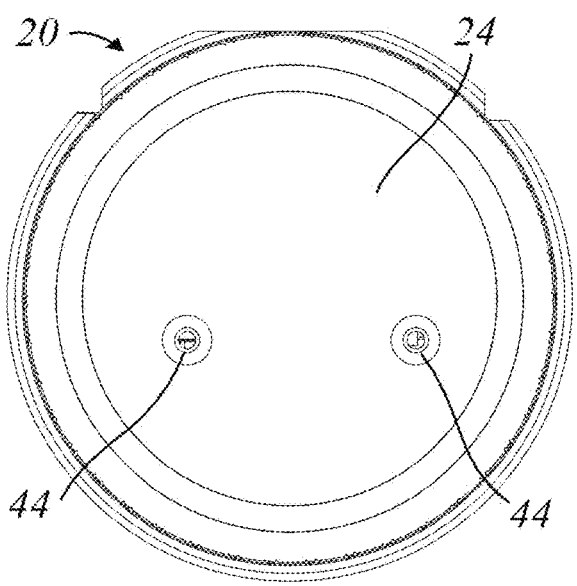
FIG. 2F is a bottom view of the apparatus of FIG. 2A.

The description, and the embodiments described therein, are provided by way of illustration of an example, or examples, of particular embodiments of the principles, aspects, or features of the present invention (or inventions, as may be). These examples are provided for the purposes of explanation, and not of limitation, of those principles and of the invention. In the specification, like parts are marked throughout the descriptive text and the drawings with the same respective reference numerals. The drawings are generally to scale, and may be taken as being to scale unless otherwise noted. Unless noted otherwise, the structural members of the container vessel may be taken as being made from molded plastic, aluminum, or stainless steel. The test apparatus card or cartridge may be understood to be made from a rigid plastic that is chemically inert relative to such reagents as may be employed. That is, the structural material, or materials, of the cartridge and non-participating relative to the reagents and reactions of the testing procedure. The terminology used herein is thought to be consistent with the customary and ordinary meanings of those terms as understood by a person of ordinary skill in the art or science to which the invention pertains.

In this description, features of the apparatus, method, or process may be given multiple names, or may be identified by a listing of synonyms. The listing of synonyms is provided to give a more fully rounded understanding of the meanings of concepts and functions sought to be described or claimed. Accordingly, the specification and claims are not intended to be limited to an in haec verba reading, or to be limited by any in haec verba requirement to any particular word or words, but rather are intended to encompass synonyms, whether or not those synonyms are found in the text of the specification or claims, reflecting that which is fairly shown or described, or both.

In terms of general orientation and directional nomenclature, for the cartridge of the test apparatus it may be helpful to define a Cartesian frame of reference in which the large or longitudinal direction lies along the x-axis or x-direction; the width of the cartridge lies along the y-direction or y-axis; and the through thickness of the card defines the z-direction or z-axis. Inasmuch as the apparatus described herein is a gravity operated device, the x-axis, or the x-direction may also be the vertical direction in use. In terms of this description, where the apparatus is gravity operated or gravity reliant, or gravity assisted, the x-direction may not necessarily be precisely vertical, but may be predominantly vertical, or sufficiently vertical for a gravity head to work on such fluids as may be employed.

The commonly used engineering terms "proud", "flush" and "shy" may be used herein to denote items that, respectively, protrude beyond an adjacent element, are level with an adjacent element, or do not extend as far as an adjacent element, the terms corresponding conceptually to the conditions of "greater than", "equal to" and "less than". To the extent that features may be repeated in an array of multiple test modules in a single cartridge, it will be understood that a description of one such module is intended as a description of all such modules without the need for repetition.

By way of general overview, in FIGS. 1A to 1E and 2A to 2G, a test apparatus, or test assembly may be indicated generally as 20. Test apparatus 20 may include a container, or housing, or structure, or vessel, or shell, or canister, or body 22. Body 22 defines the space envelope in which the other components of assembly are accommodated. Body 22 may have, and as shown in FIGS. 1A to 2E does have, a first end 24, a second end 26, and a peripheral sidewall 28 extending between first end 24 and second end 26. In the embodiment shown, peripheral sidewall 28 is cylindrical, and, as shown, may be circular, or predominantly circular. In normal operation body 22 sits upright with first end 24 at the bottom, acting as a flat base, an second end 26 at the top.

Second end 26 may be termed the top of body 22, and, as shown, may include a lid or cap, or access, or cap assembly 30 that mounts to the upper end of sidewall 28. Cap assembly 30 may, and as shown does, include a closure 32 that is movable between a first position and a second position, which may also be termed an open position and a closed position, to govern access to the functioning portions of test apparatus 20. Peripheral sidewall 28 may have a lower portion 34 and an upper portion 36. They may be mutually axially engaging. The outside of one, the other, or both may has a roughened surface, such as knurled surface 38 of lower portion 36. Lower portion 36 and first end 26 may have the combined form of a cup or blind socket, and may be made from a single molded part. Cap assembly 30 may include a depending skirt 42 that mates with the upper end of peripheral sidewall 28 in mutual engagement. Such engagement may be a threaded engagement. When assembled, body 22 may define an internal space or chamber, 40, in which other portions or modules of assembly 20 are located. The interior of chamber 40 is a containment chamber, or environment, in which testing of samples may occur.

Body 22 may function as a frame or container, or housing in which to mount the other items or components or modules of assembly 20. Considering FIGS. 3A, 3B and 3C, and 4A, 4B, 4C and 4D, there may be a first structural member, which may be a spider, or skeleton, or base, or board, or frame 50 that forms a structural datum to which other components mount or attach. Frame 50 may be a molded plastic part. There may be, and in FIGS. 3A, 3B, 3C and 3D, there is, an integrated circuit board 60 that mounts to frame 50. The circuit board, and apparatus 20 more generally, may have, and as illustrated has, an electrical power storage device, which may be rechargeable, such as a battery pack or battery 70 that is mounted to frame 50 and in electrical connection with circuit board 60 and with the other electrically operated components of apparatus 20, either directly or indirectly.

There may be, and as illustrated in FIGS. 3A, 3B, 3C, and 3D there is, an electrical interface connection 62 in a fixed mounting relative to frame 50, and therefore to circuit board 60. Electrical interface connection 62 is in electrical connection with circuit board 60. Electrical interface connection 62 may be an electrical socket, whether male or female, for mating engagement with a corresponding electrical connector. In one embodiment, as illustrated, electrical interface connection 62 may be a USB port 64. Whether it is a USB port 64, or some other kind of connector, the connection provided permits the supply of external power to apparatus 20, by which to re-charge battery 70 from time to time as needed or convenient. Furthermore, whether it is USB port 64 or some other electrical connector, the connection also permits the transmission of information, such as test results, from apparatus 20. That is, the connection provides both a power supply link and an information transfer port. There is a cartridge holder assembly, or simply a cartridge holder, 80 to which a processor 90 is mounted.

There is an output array 66. Output array 66 may be mounted to circuit board 60, and may, in particular, be mounted to an end thereof, such as the top end thereof, which is to say an end or region thereof that, when frame 50 is located within chamber 40, is closest to cap assembly 30. Output array 66 could be an interactive audible output. That is to say, integrated circuit board 60 could include audible signals, or could include a synthesized voice output, as appropriate. Alternatively, as shown output array 66 may include a set or array or visual outputs, such as lights 68. In the embodiment illustrated there are four such lights 68, although there could be more. The lights or combination of lights displayed may indicate the status of apparatus 20, or, alternatively, may indicate the status of testing underway in apparatus 20. That is, one light or combination of lights may indicate that apparatus 20 is connected to power, or, when running on battery charge, that the device is charged, or in need of charging. Another light or combination of lights may indicate the status of testing—ready for a new test, undergoing testing, finished testing, a positive result or a negative result, and so on. Lights 68 of output array 66 may be mounted to extend axially to protrude upwardly through, or to be visible wen looking at, cap assembly 30 as mounted.

Frame 50 may be generally rectangular, having a first or lower portion 52 that is, effectively a bottom cross-member and an abutment, or footing that locates in the bottom of body 22. To that end, it may have an indexing feature, such as a locating boss or datum, in this case the bottom end face 48 of frame 50 that engages a mating internal indexing feature or cavity within bottom end 24 of body 22. Frame 50 has first and second longitudinally extending members, or sides, or sideframes 54, 56 that form the sides of the rectangular shape of frame 50. Sideframes 54, 56 are spaced apart from each other and that extend upwardly and away from bottom cross-member 52 toward cap assembly 30. At the far, or upper end, frame 50 may have another cross-member or transom, or panel 58 that is generally rectangular and that covers the upper ⅖ to ½ of frame 50. The top end face 46 of the top cross-member abut with, and is secured to, the inside underface of end cap assembly 30 as at fasteners 44.

Frame 50 has first and second faces, arbitrarily designated as a front side or front face, 72 and a back side or back face, or back plane 74. Back plane 74 may, and in the embodiment illustrated does, define, or function as, a datum plane to which the location of other elements of the assembly are referenced. In the context of assembly 20 standing upright, this datum plane of back plane 74 is a plane extending in the x and y directions, and so it an x-y plane. To perform the function of establishing a geometric datum for the other components of assembly 20, there are, first, end faces 46 and 48, as noted, that are attached by fasteners 44 to cap assembly 30 and to bottom end 22, thus fixing both their relative spacing and their orientation. In this manner, end faces, 46, 48 are, or function as, indexing members. Frame 50 has an array of indexing members that function to establish the relative x, y and z positioning of the various components of the assembly. In the lower region, frame 50 has an internal opening 76 that passes through frame 50 and can also be thought of as establishing a well, or installation space. Opening or well 76 is bounded by bottom cross-member 52, top cross-member 58, and left and right side frame members 54 and 56. The upper surface of lower cross-member 52 has a circular cylindrical protrusion 78. The rearward surface of protrusion 78 has an indexing member, or abutment 82 in the form of a boss that stands rearwardly proud of the main face of protrusion 78, thereby forming a ledge or shoulder that receives, and locates, the lower end of circuit board 60 against the horizontal flat edge thereof. Left hand side frame 54 has a pair of such outwardly standing indexing members or abutments 84, 86 with vertically running flat edges that locate the left hand edge of circuit board 60. Similarly, right hand side frame 56 has an outwardly standing abutment 88 that locates, i.e., bounds the position of, the left hand edge of circuit board 60 on installation. Indexing members, or abutments 82, 84, 86 and 88 for a set of locating fittings that provide a coarse, or preliminary fit, of circuit board 60. When circuit board 60 is in place, final fitting adjustment is provided by the attachment at two threaded fitting screw holes 92 through which fasteners positively secure circuit board 60 as at blind holes 94.

Battery pack or battery 70 installs behind the back plane 74 of frame 50, between the lower portion or lower end of circuit board 60 and the inside of bottom end portion 24 of body 22. Release of fasteners 44 of end portion 24, and removal of end portion 24 permits replacement of battery 70. It may be noted that the battery, being relatively heavy, is located at the bottom of assembly 20 near its base, and, being located at a low position tends to contribute to the stability of the unit when it stands upright on that base.

A processor chip or card 90 locates within well 76 between protrusion 78 and left hand frame member 54. Card 90 mounts to the front side of circuit board 60, i.e., the opposite side of circuit board 60 from battery 70. Left side frame 54 has an opening, or socket, for a power cable from battery 70 to connect to processor 90.

Cartridge holder 80 is mounted to the upper end or upper region, or upper portion of frame 50 on the front face 72 thereof. The vertical location is established by indexing members in the form of stops or shoulders or abutments 98 of side frames 54, 56. It is held in place with a set of fasteners that secure it in a fixed, known position relative to frame 50, and therefore relative to circuit board 60. The back face 92 of cartridge holder 80 is dimensioned to conform to the inside profile of the canister, i.e., body 22, to permit axial sliding insertion into skirt portion 36. The front face 94 of cartridge holder 80, i.e., the face of cartridge holder 80 that mounts to frame 50 and faces toward circuit board 60, is planar, and mates with the corresponding planar surface of front face 72 of frame 50. An accommodation, or slot, or rebate, or socket, or space or seat, 96 is formed in front face 94 of cartridge holder 80. Accommodation 96 is sized to receive the downward end of cartridge 100. As shown, cartridge holder 80 has a generally U-shaped wall, or land 104 that surrounds accommodation 96 on three sides, and that is open on the fourth, upward side. Land 104 mates with front face 74 of frame 50. The vertical position of cartridge 100 when seated in accommodation 96 is governed by an indexing feature in the nature of a knob, or protrusion, or stand-off 102 that stands upwardly proud of the downwardmost end face of accommodation 96. When cartridge holder 80 is positioned on frame 50, the main web of frame 50, namely upper cross-member 58, extends cross-wise from side frame 52 to side frame 54 and defines, or forms, or acts as, a web or partition lying in a vertical plane closing off the otherwise open fourth side of accommodation 96. It also lies in a vertical plane between circuit board 60 and accommodation 90, shielding the one from the other.

In cross-section, accommodation 96 forms a channel that is blind at the bottom end. The back 106 of the channel has an opening, or aperture, or window, 108 formed therein. The window frame of window 108 has outwardly chamfered lateral sides. A heating plate 110 fits in window 108. Heating plate 108 has correspondingly chamfered sides that permit it to seat in window 108, but, like a wedge, do not allow it to pass through. Heating plate 110 is made of a high thermal conductivity material. In the context of this description, "high thermal conductivity" means greater than k=1 W/MK. The material of heating plate 110 may be a metal. It may be a metal such as stainless steel (e.g., k=8-20 W/MK) or such as aluminum (e.g., k=approx. 200 to 210 W/MK). In the embodiment illustrated, heating plate 110 is copper, or a copper alloy (e.g., 380 to 390 W/MK). Heating plate 110 may tend to spread the heat input it receives to a more even distribution.

Figure 3A:
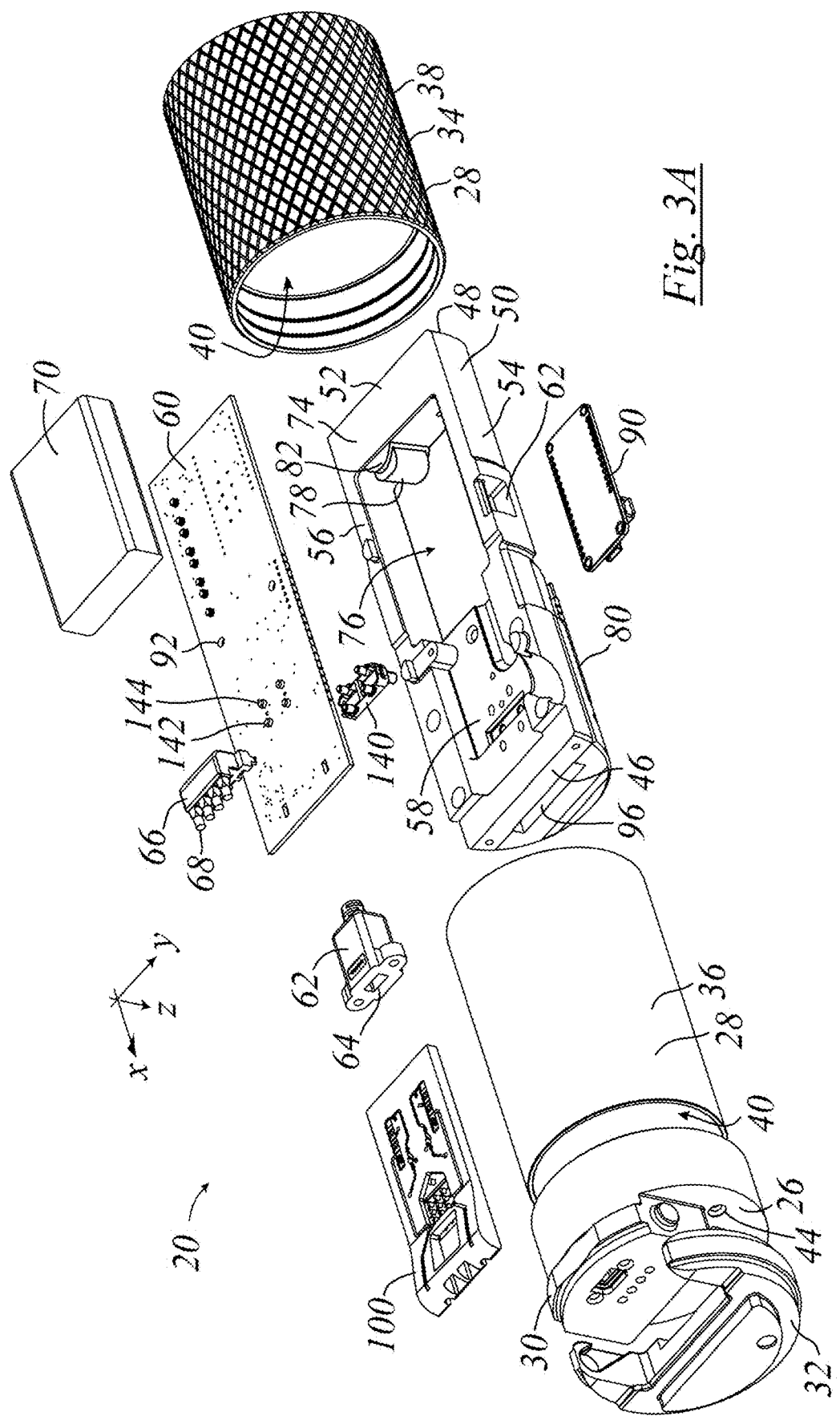
FIG. 3A is a perspective exploded view of the apparatus of FIG. 1A.
Figure 3B:
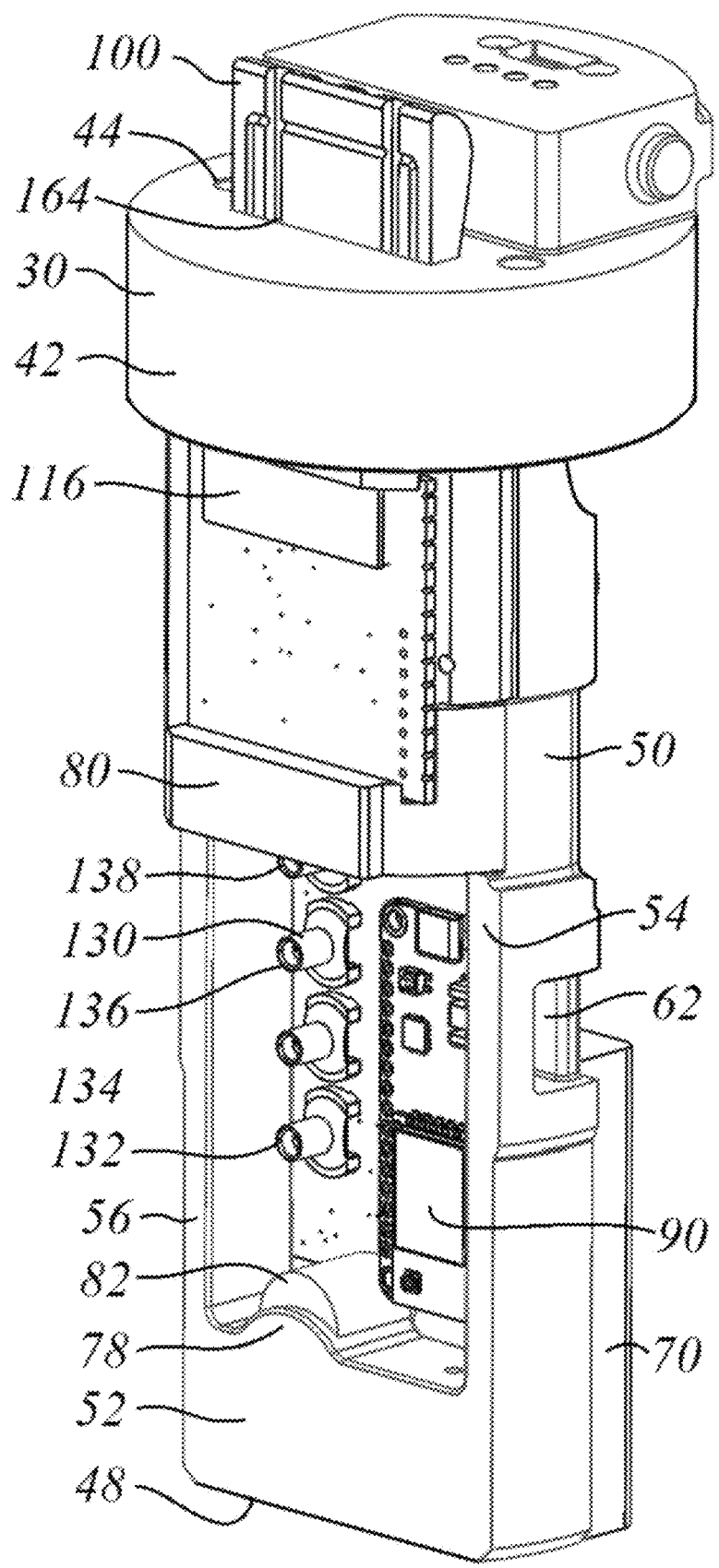
FIG. 3B is a perspective view from in front and to the left of the apparatus of FIG. 3A removed from its protective canister or housing.
Figure 3C:
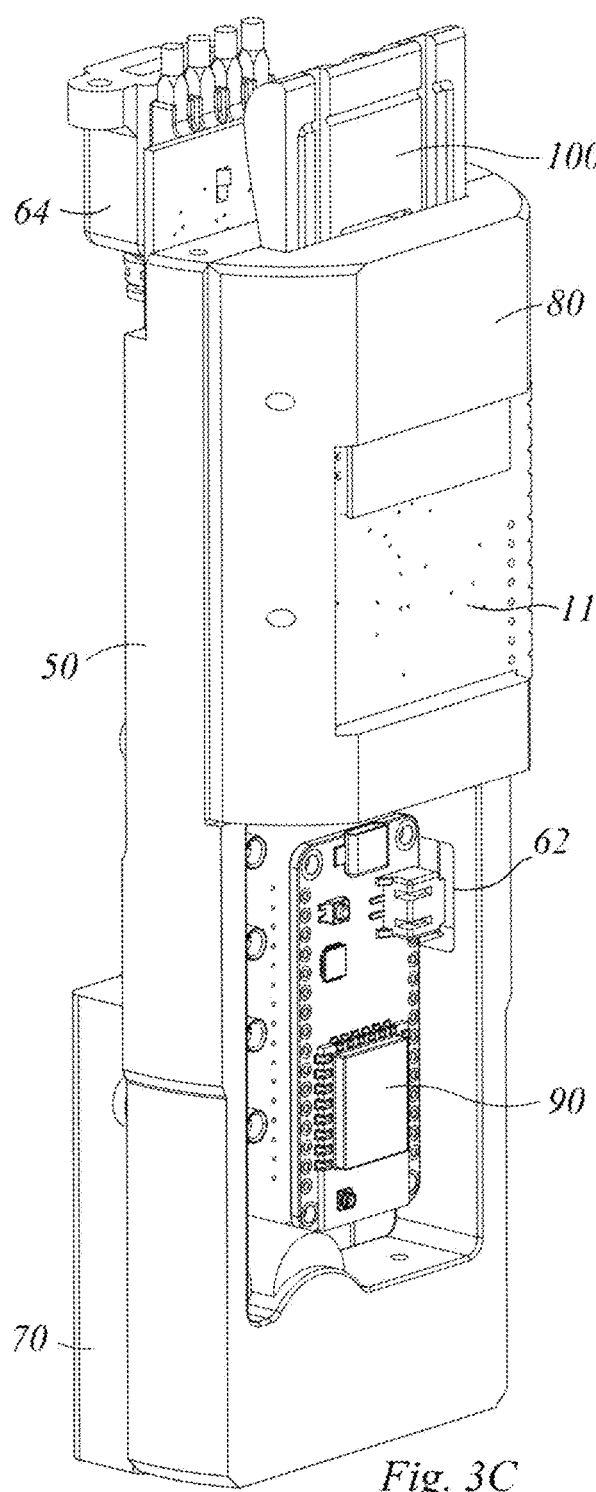
FIG. 3C shows the apparatus of FIG. 3B from a perspective view obliquely from behind, with the cap removed.
Figure 3D:
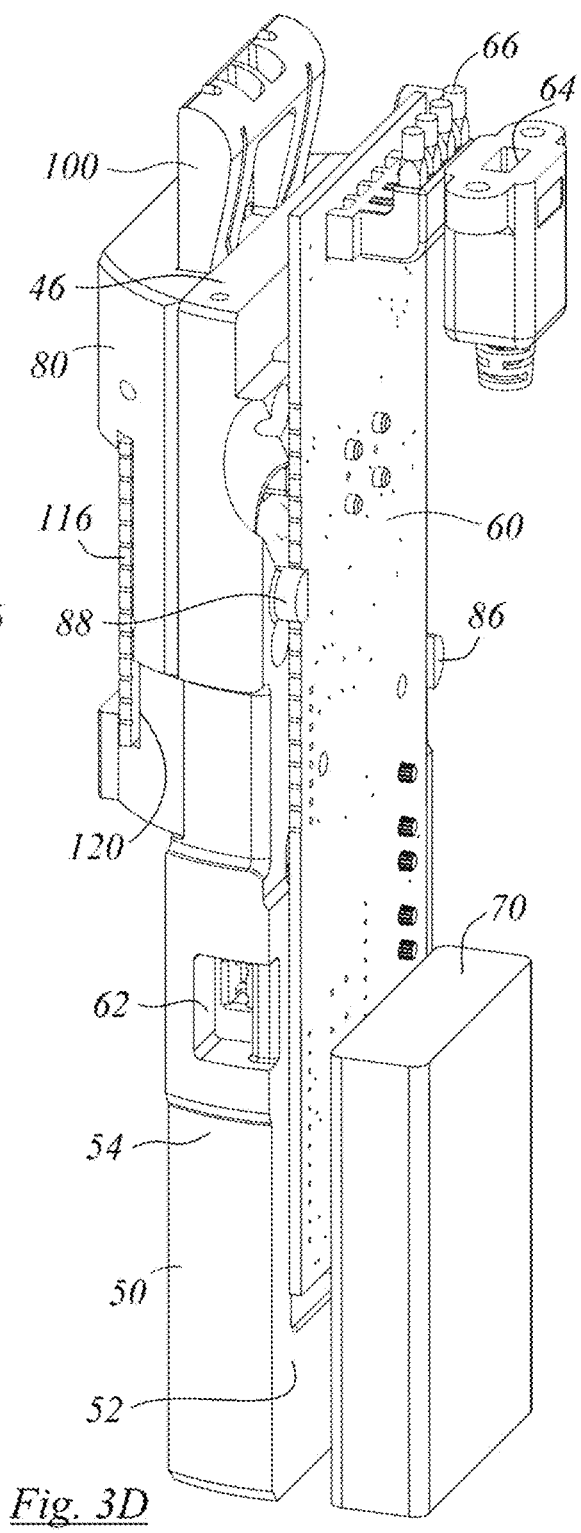
FIG. 3D shows a perspective view from in front and to the right of the apparatus of FIG. 3A.
Figure 4A:
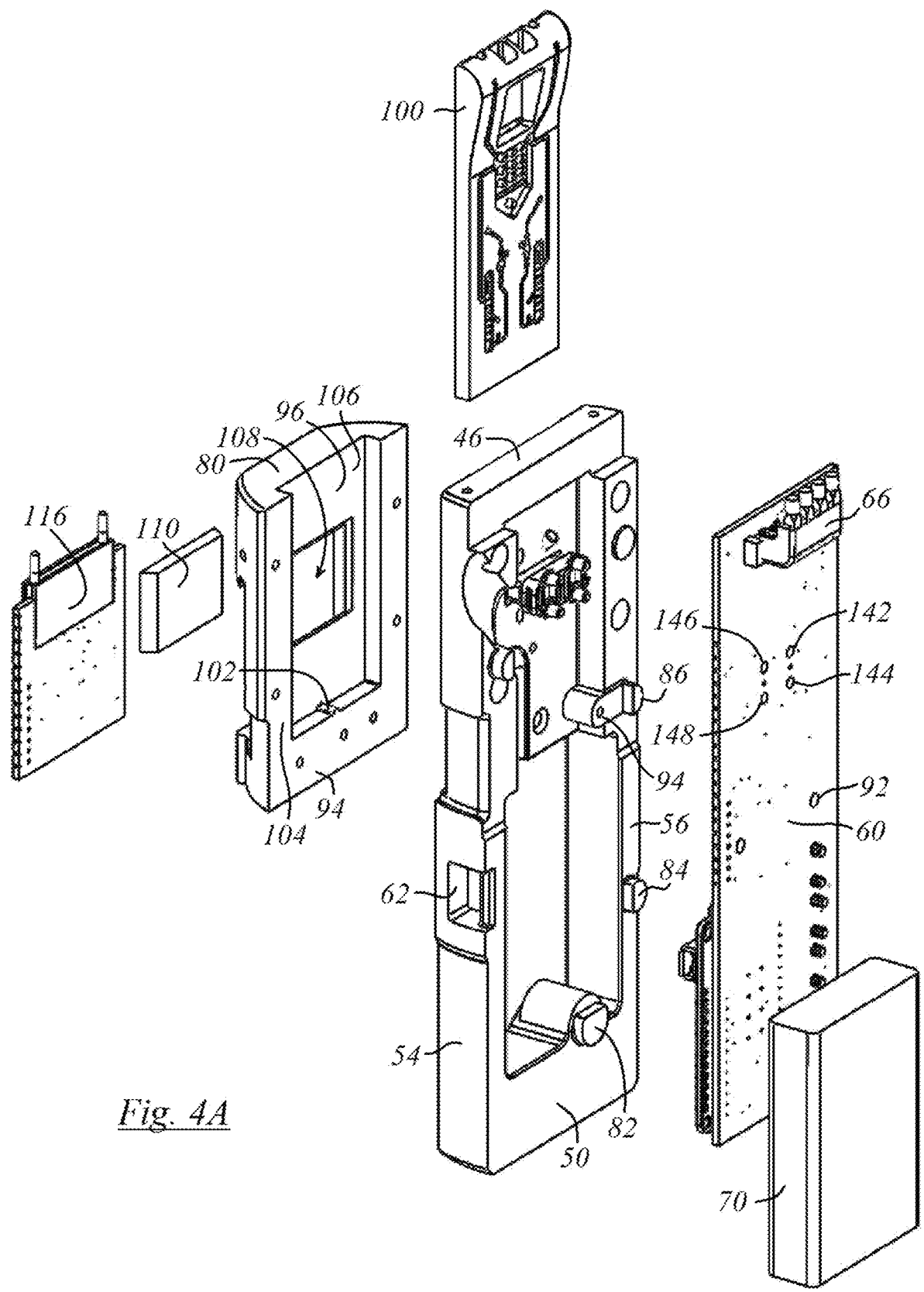
FIG. 4A provides an exploded left hand perspective view of a reader and cartridge assembly of the apparatus of FIG. 3A.
Figure 4B:
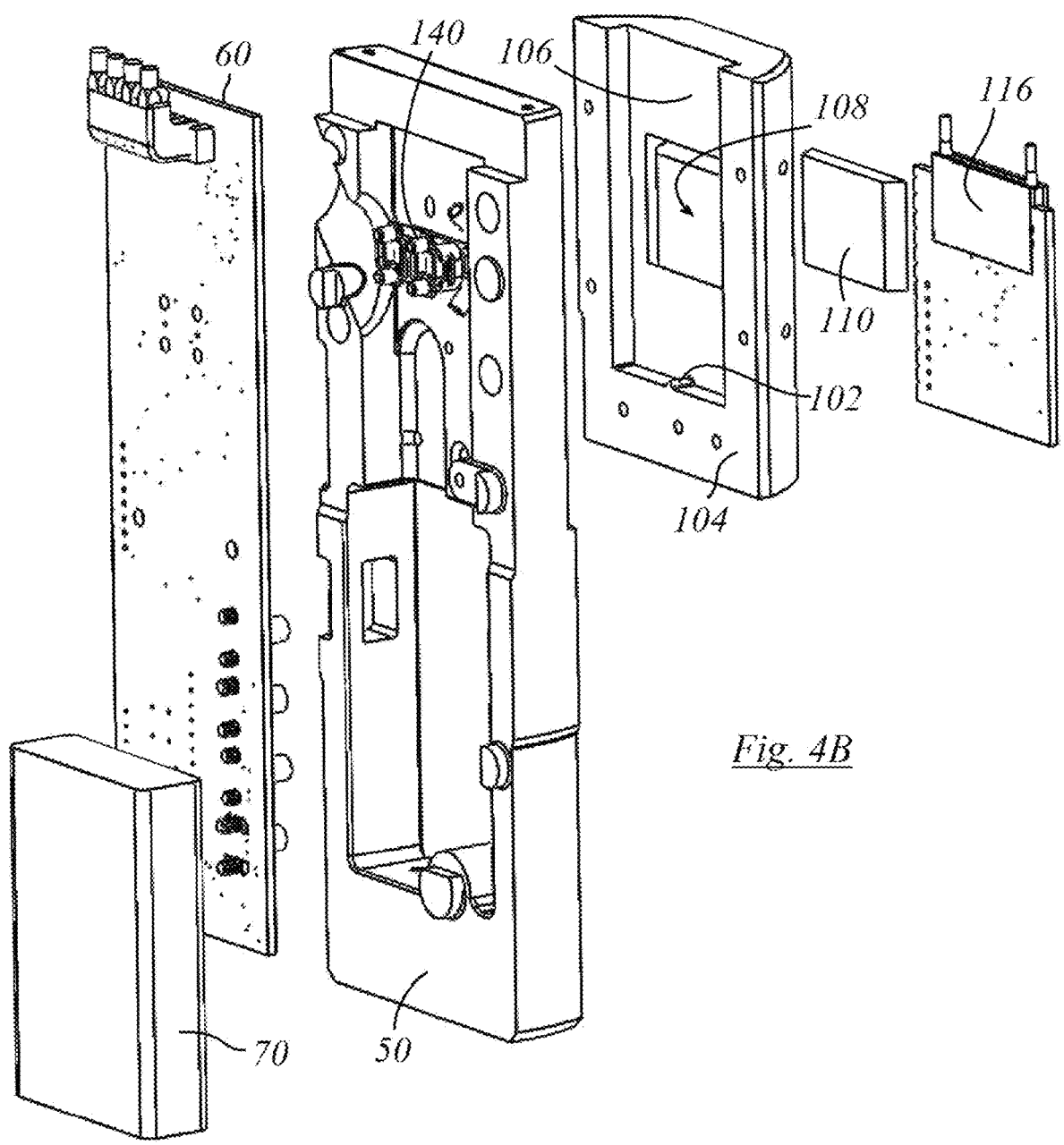
FIG. 4B is a corresponding right-hand exploded view to that of FIG. 4A.
Figure 4C:
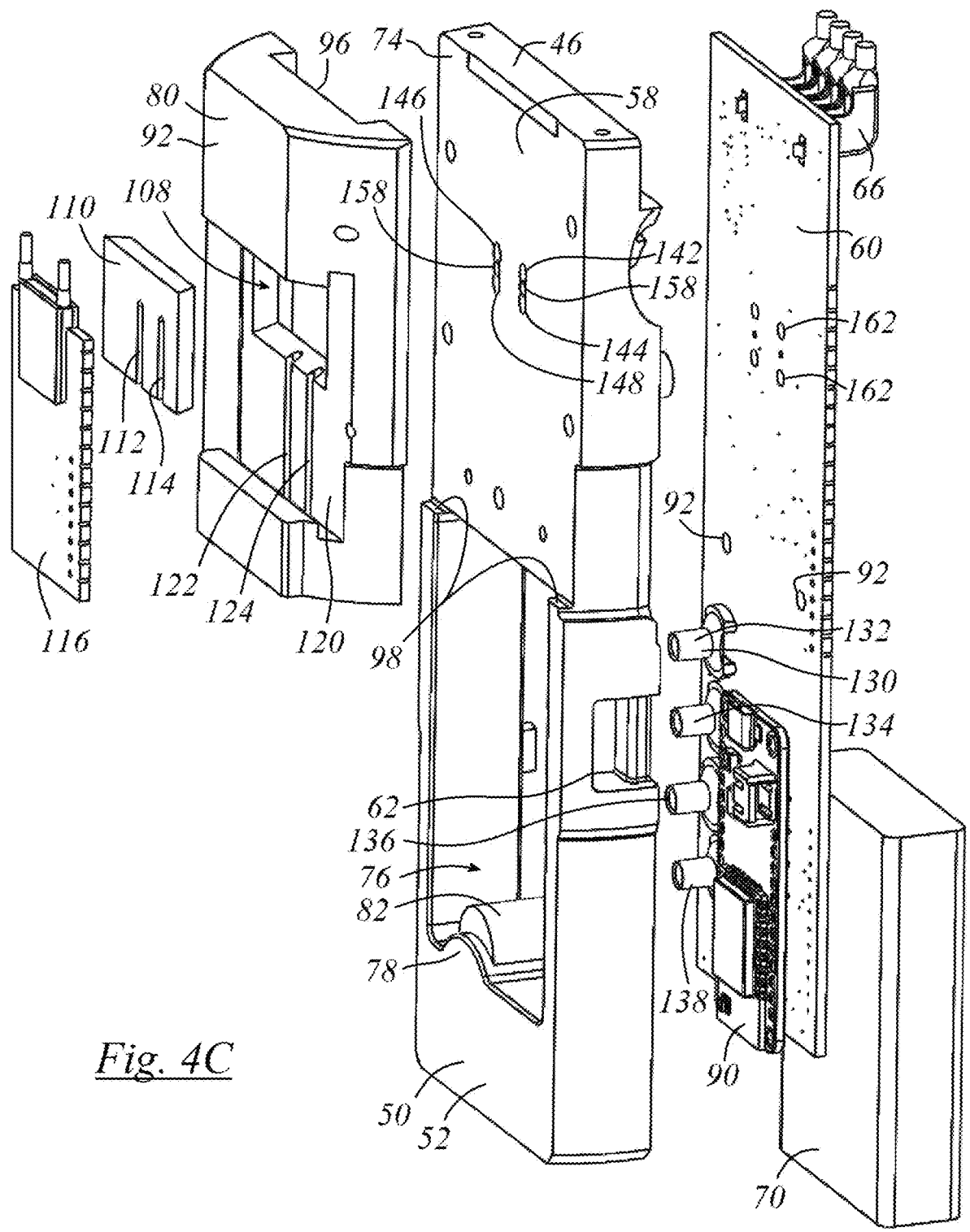
FIG. 4C is a corresponding exploded view of the apparatus of FIG. 4A from behind.

Looking at the views of FIGS. 3B, 3C, and 4C, the back of cartridge holder 80 also has an accommodation, or rebate, or relief, or lodging, or seat 120 formed therein. Also seen in seat 120 is a pair of channels, or chases, or slots, or grooves 122, 124. When heating plate 110 is in place, corresponding channels, or slots, or grooves 112, 114 that align with grooves 122, 124. Thermocouples, or thermistors locate in these grooves, and are used to monitor the temperature at heating plate 110 during operation. An electric heater 116 mounts in a seat 120 in the back of cartridge holder 80. Heater 116 may be a combined heater and electric cooler. In the embodiment shown, it is a heater. As installed, the heating element of heater 116 bears against heating plate 110, and is operable to heat heating plate 110 in operation. Heater 116 is controlled by processor 90.

An array or set of illumination sources 130 is also mounted to circuit board. There may be, and in the embodiment illustrated there are, four such light sources 132, 134, 136 and 138. They may be, and in the embodiment illustrated are, LED light sources that may selectively be operated to emit white, red, green blue or yellow light. The respective mounting toes 126, 128 protrude through the back of circuit board 60.

Figure 4D:
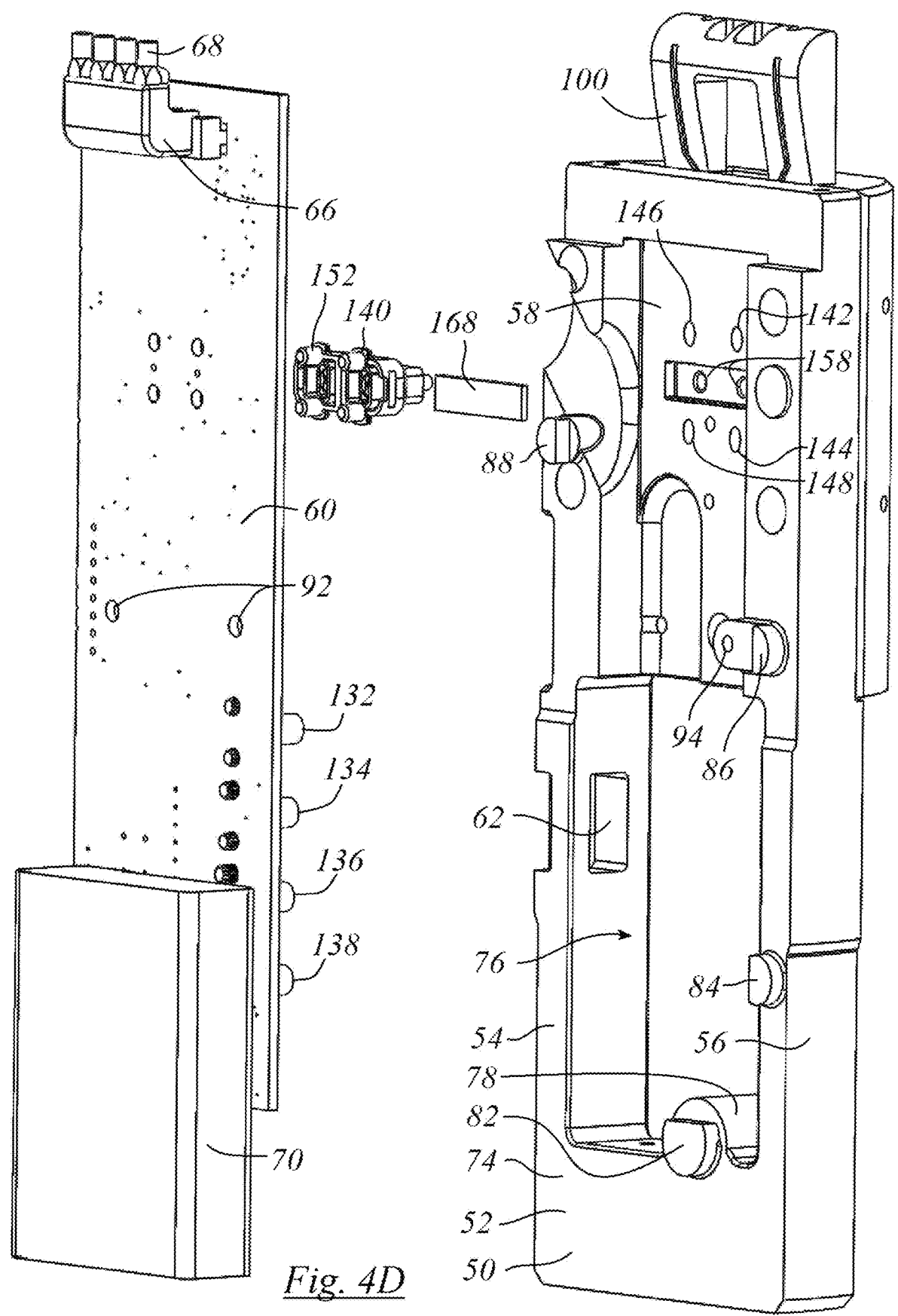
FIG. 4D is an exploded view of the apparatus of FIG. 4A, similar to FIG. 4B, showing separation of the optical sensor.
Figure 4E:
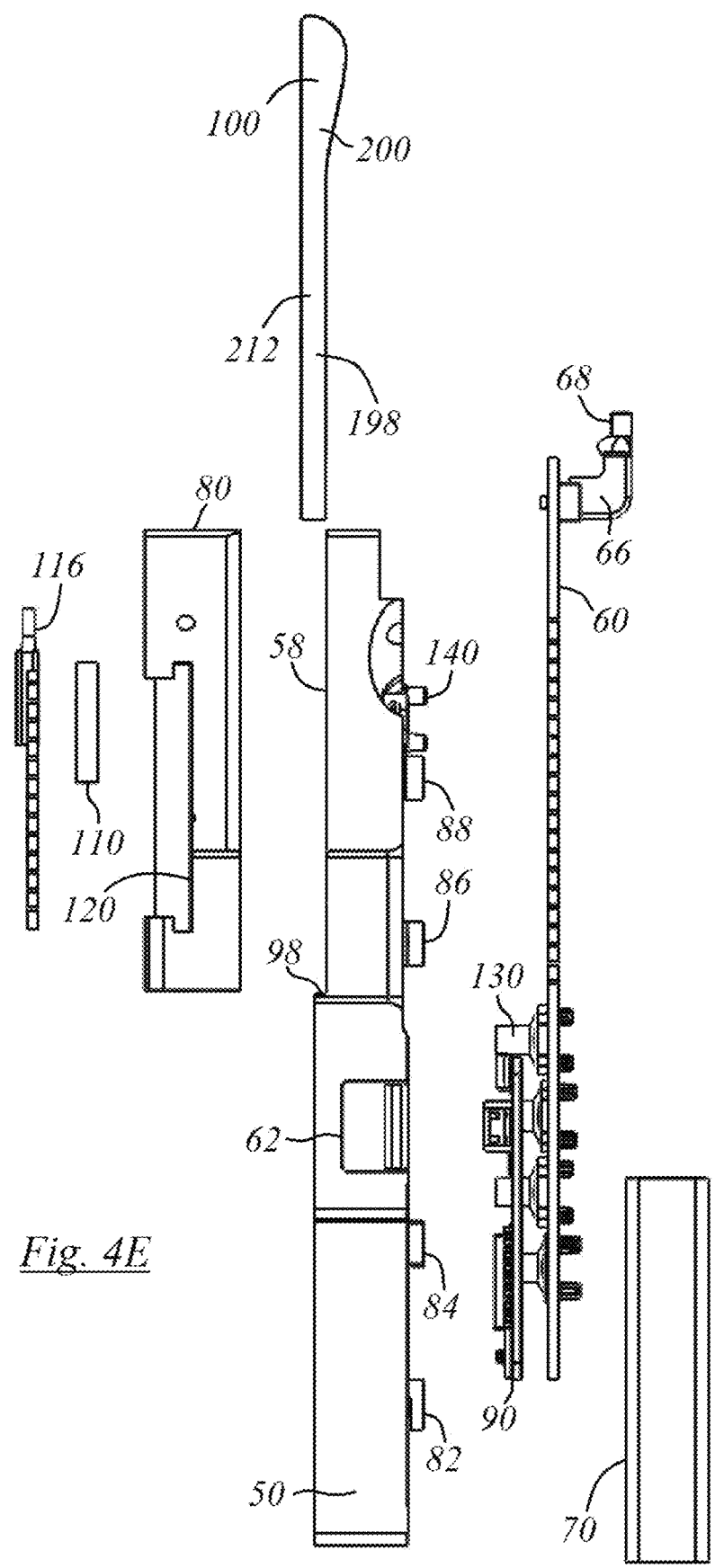
FIG. 4E is a side view of the reader and cartridge assembly of FIG. 4A, showing the relative placement of their components.

A corresponding set of fiber-optic members 156 (FIG. 8B) carry light from the array of illumination sources 130 to ports 142, 144, 146, 148 in upper cross-member 58, (FIGS. 4C, 4D and 8B through which their ends protrude. Note that fiber optic members 156 pass through cross-member 58 at an oblique angle, which is shown as being 45 degrees. Accordingly the entry and exit ports are elliptical in the x-y-planes, and, since fiber optic members are angled to converge toward cartridge 100, the entry ports on the back of cross-member 58 are further apart than the exit ports facing accommodation 96. A sensing assembly 140, which may be, and in the embodiment illustrated is, an optical sensing assembly, locates between ports 142, 144, 146, 148. Assembly 140 has feet 152 that locate through holes 150 in circuit board 60 to place optical sensor 154 facing toward accommodation 96. An opening 158 is formed in cross-member 58 to admit the protruding optical sensor, or sensors. Opening 158 may be rectangular as shown. The leading or distal end of optical sensor 154 lies flush with the ends of fiber optic members 156, the illumination and sensing member then being co-planar in a plane that is also substantially flush with the surface of the web of upper cross-member 58 of frame 50 as seen in FIG. 8B. Inasmuch as photoelectric sensor element 172 is located at the base of the lens element of optical sensor 154, a light barrier 168 is mounted on the back or circuit board 60 to discourage stray light from illumination sources 130 from reaching photoelectric sensor element 172. Optical sensing assembly 140 is shown as having two optical sensors 154, side-by-side (in the y-direction), such that two tests can be done at one time on a single cartridge 100 that has more than one test sample.

Output module or output array 66 is mounted to the upper edge or margin of circuit board 60, and has display array 68 that locates in, and protrudes through, cap 30. The body of cap 30 also has a second accommodation 166 in the form of a blind slot or seat that is sized to receive the bottom end of cartridge 100 e.g., when it is being loaded with a sample. That is, it provides a holder so that the user has both hands free.

The combination of processor 90, optical illumination sources 130, and optical sensor assembly 140 can also be termed the card reader. The larger term "card reader" can also be applied to those elements plus circuit board 60, and its various connections, and to output array 160. Apparatus 20 may be considered as a whole as a sample reading, or card reading assembly. It processes the sample, and reads the results in a single hand-held unit.

On assembly, frame 50, with the foregoing elements attached and with electrical wiring connections also attached, slides into the sleeve, or housing defined by upper portion, or second end 22, such that it aligns with the fastener holes in cap 30, and fasteners 44 are used to hold them together. In such position, the upper slot opening of accommodation 96 aligns with the corresponding slot 164 in cap 30. Similarly, terminal 170, which may be, and in is shown as being, a USB port which may be used to transmit data or power or both mounts to the underside of cap 30 in alignment with USB port 64. Terminal 170 provides power to processor 90 and to battery pack 70.

Also on assembly, once frame 50 is in place, lower end 24 slides over the lower portion of the reader assembly, and engages the upper portion. Fasteners 44 in the end face, i.e., the base wall, of the canister secure lower end 24 in position relative to frame 50, and accordingly also to the other components of apparatus 20.

Cartridge 100 can be identified as a modular test cartridge. It has a body 200. Body 200 of test cartridge 100 may be formed from a molded plastic material. The plastic material is inert, i.e., non-participating, relative to the chemicals, reagents, samples, and reactions for which cartridge 100 is to be employed. The molded plastic material may be a transparent plastic. Alternatively, the plastic may be non-transparent. It may be opaque. It may be made from a non-transparent plastic material, or it may be coated in whole or in part. For example, it may have an external black coating such as may tend to absorb input radiation, such as light, and such as may obstruct light from reaching reagents or chemicals, or samples such as may be stored in cartridge 100 in storage prior to use, during testing, or in storage after testing. Body 200 has a shank, or lower portion, or first portion or major portion 202 that inserts into accommodation 96, (for processing) or accommodation 166 (for loading the sample to be tested) and a head, or upper portion, or second portion, or minor portion 204 that protrudes upwardly out of accommodation 96 in use. That is, being a gravity-driven device, in use cartridge 100 seats in an upright position in accommodation 96 with the shank at the bottom and the head of upper portion 204 at the top. Notably, upper portion 204 is contained within cavity 162 of lid closure 32 when it is closed. Lid closure 32 is movable to an open position to permit cartridge 100 to be introduced or removed from accommodation 96. Body 200 of cartridge 100 has a front face 198 and a rear face 212. The upper portion 196 of front face 198 along upper portion 204 is formed on a smooth curved surface 206, seen in profile in FIGS. 6C and 6D, that has slope continuity at the transition to lower portion 202, and that also has slope continuity at its widest point. The lower portion of the curved surface is designated as 208, and the upper portion as 210. Upper portion 210 curves smoothly around to rear face 212 of cartridge body 200.

Cartridge 100 has a series of passageways formed in body 200. On the front side, (FIGS. 5A and 6A) there are two sets of flow paths, or pathways, or fluidic circuits or passageways 220, 222, corresponding to two sample test chambers. Those flow paths may be, in whole or in part, micro-fluidic circuits. Inasmuch as these two passageways, or paths, or circuits are the same, other than being of opposite hand, the description of one will be understood also to be a description of the other, without need for duplication of description.

Each flow path has a first zone, or region or portion, a second zone or region or portion, and a zone or region or portion, with respective first mixing chamber 224, second mixing chamber 242 and third mixing chamber 270, however those mixing chambers may be called. They are discussed below. In the first region, there is a first zone, or chamber, or mixing chamber or cavity, or well 224. Well 224 may be a single well for both flow paths 220, 222 (and however more flow paths there may be), or alternatively, there may be a septum, or partition, or wall 228 that divides well 224 from its neighbour. Well 224 may be thought of, or called, an antechamber of its respective flow path, or paths, in which a sample to be tested is first received. It has an array of posts, or pegs, or stand-offs 226. Well 224 may be pre-filled with a quantity of a first reagent, $R_1$. The reagent $R_1$ may be a liquid reagent, and may be a buffering compound, as opposed to a particular test reagent or a processing reagent as identified below. The posts or stand-offs 226 are closely spaced and the thickness of well 224 in the through-thickness or z-direction of cartridge 100 may be relatively shallow. The first reagent may therefore tend to stay in place under the influence of surface tension. Although well 224 is formed in lower portion 202, well 224 has a first inlet, or reagent inlet 230, with which is formed in lower portion 208 of curved surface 206, and a second inlet, or sample inlet 232 in upper portion 210 of curved surface 206. The demarcation between curved surface portions 208 and 210 is at the location of tangency of curved surface 206 to the vertical. That demarcation line is identified as 234. First inlet 230 is below that line 234. Second inlet 232 is above that line. Line 234 falls in the midst of a smooth continuous surface from side to side of cartridge 100. This continuous surface forms a land. That smooth continuous surface runs from the upper edge of inlet 230 to the lower edge of inlet 232. A first passage, or groove or overflow, or escape, or vent 214 is also formed in upper portion 204, and runs from an inlet at the top outside corner of well 224 to an outlet 216 formed in upper portion 210 of curve surface 206. There is a vertical web 218 formed between the front and back portions of well 224. Sample liquid entering rear portion 236 passes through an array of apertures 268 in web 218 to pass into forward portion 238. Either one or both of portions 236 and 238 may have a pre-positioned reagent. The aperture array or grid, or grille, may tend to promote mixing of the sample with the reagent, and may tend to promote settling, as encourage air bubbles to rise to the top.

A first flow path, or flow conduit, or flow channel 240 has an inlet near the top of well 224, but below the inlet of vent 214. When liquid reaches the inlet of channel 240, it may prefer to flow into channel 240, rather than out vent 214. First flow path channel 240 leads to the second stage, or mixing chamber, or second chamber, or second well, 242. Chamber 242 has a known geometry, and a known volume $V_{242}$. It has an upper portion 244 and a lower portion 246. Upper portion 244 has a flow divider stand-off 248 and an outlet at an outlet valve 250. Chamber 242 has relatively shallow depth. Lower portion 246 has posts, or studs, or stand-offs 252. It may also have weirs, or ridges, or ledges 254 which narrow the outflow, or inflow, and such as may tend to retain pre-positioned reagent so it remains in place.

The pre-positioned reagent, $R_2$, whatever it may be, also has a known volume $V_{R1}$. In the context of testing, the "second reagent" $R_2$ may also be considered the "first reagent" in terms of a particular reagent specific to a given test, more so where, optionally, no buffer reagent has been used in chamber 224. Similarly, chamber 242 may be thought of as defining a first processing chamber or a first processing zone. What is "first" and "second" depends on context.

Figures 5A, 5B:
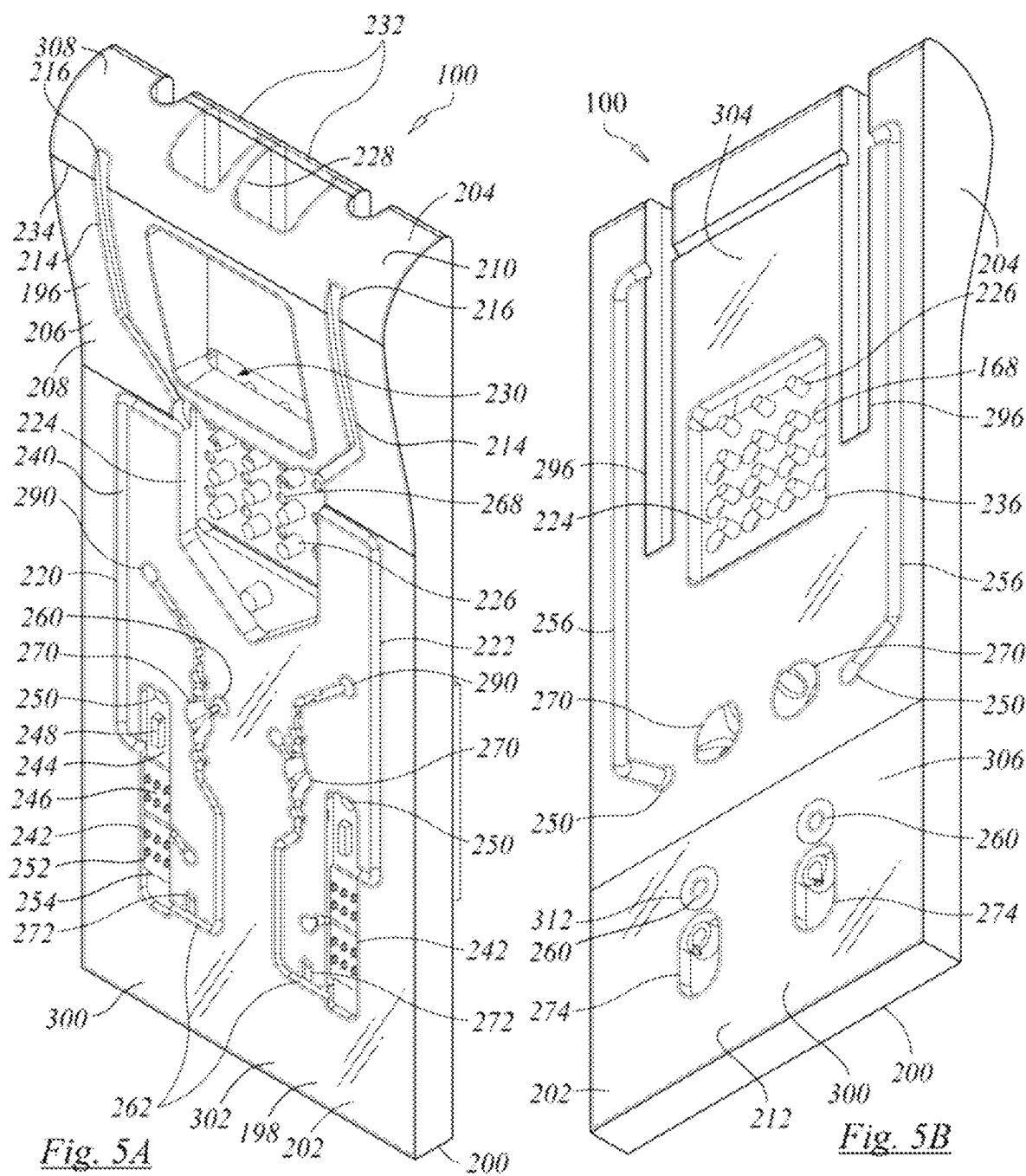
FIG. 5A shows a front perspective view, to the left and slightly above, of a test cartridge for use with the apparatus of FIG. 1A.
FIG. 5B shows a rear view from the right and below, of the cartridge of FIG. 5A.
Figures 6A, 6B:
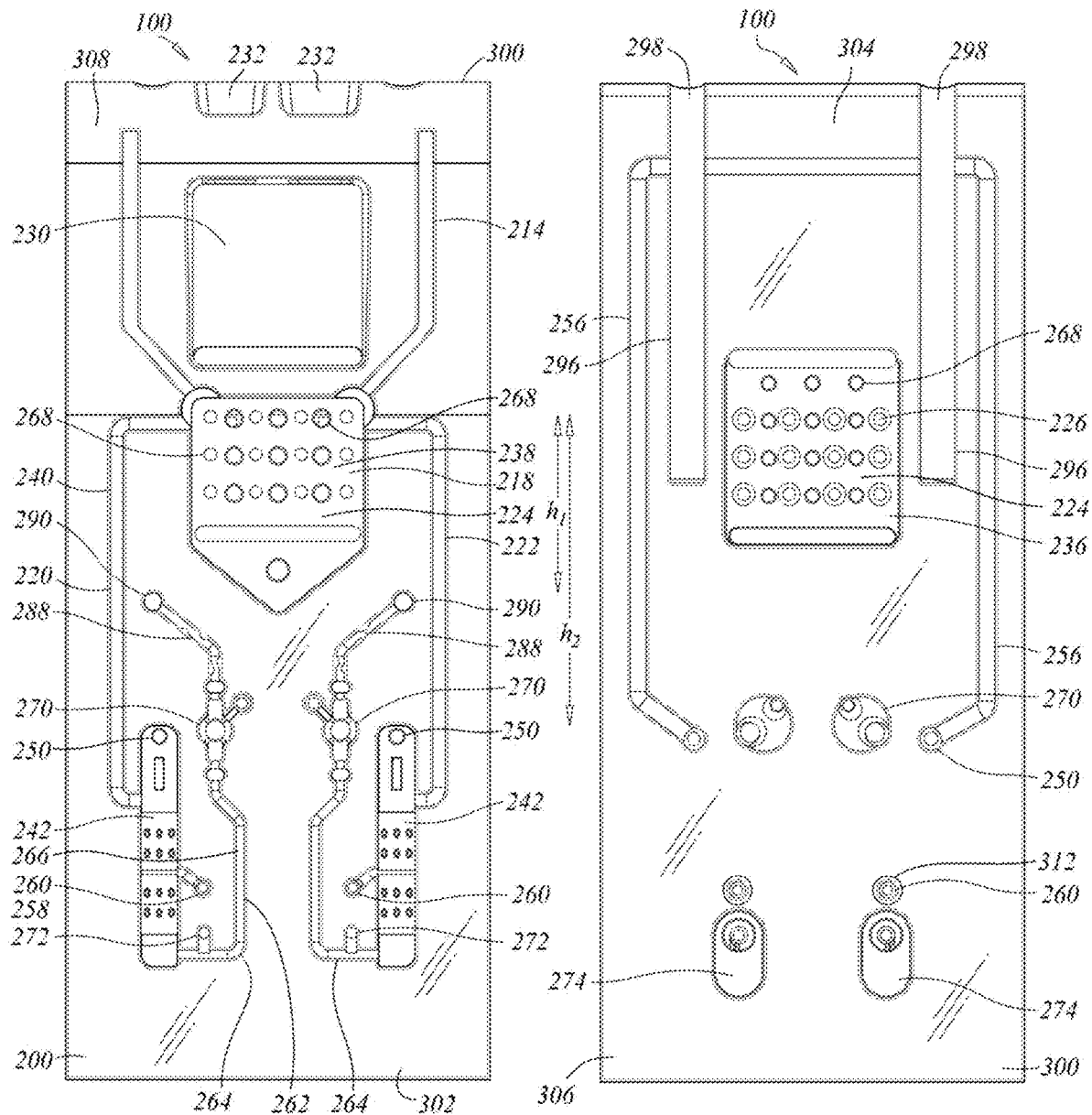
FIG. 6A is a front view of the cartridge of FIG. 5A.
FIG. 6B is a rear view of the cartridge of FIG. 5B.

Valve 250 leads to a passage 256, which is an escape or vent line, seen on the back of body 200 in FIGS. 5B and 6B. Valve 250 may be anywhere along vent line passage 256 that is lower than the outlet of well 224. It is convenient that it be located at the top of second well 242. Valve 250 is a passive valve. That is, it self-actuates, e.g., as opposed to actuating on an electrical signal command. Valve 250 has a valve cavity that contains a polymeric ball or polymeric plug 294. Although the ball or plug may move mechanically in the presence of water or a water-based solution, (i.e., an aqueous fluid), whether due to buoyancy or drag, ball or plug 294 is hydrophilic, i.e., moisture sensitive. When contacted by an aqueous solution, the plug or ball swells to fill the valve cavity and block the passageway, thereby having a first position or condition in which it permits flow through passageway 256, and a second position in which it obstructs flow through passageway 256. It need not be ball shaped but could be a tapered cone, or plug or prism. In changing its state or condition it governs flow through passageway 256. That is, it has a first state, or condition, or position in which it allows flow, e.g., it allows the escape, or displacement of the original fluid in the chamber such as gas, such as air. It also has a second state, or position or condition in which it has been self-activated to obstruct flow in the vent or escape passage.

Second chamber or well 242 also has a loading port 260 that has a discharge groove or manifold, or ditch, or channel 196 in the middle of the height of lower portion 246. During loading of the selected reagent, cartridge 100 is placed on its front, so that it is substantially horizontal, reagent introduced into lower portion 246 through port 260, and along groove 196 may tend to fill the space between weirs 254 evenly or relatively evenly. Surface tension between the various wall and post surfaces and the reagent may tend to hold the reagent in place during movement and storage.

Second chamber or well 242 has a lowermost portion 258, which may be termed the sump or discharge of well 242. It leads to a further, or second, flow passageway 262 which has a lateral leg 264 and an upward leg 266 that leads to the third stage or third portion of lab-on-a-chip cartridge 100, identified as third mixing chamber 270.

Along passageway 262, there is a tap, or tee, or branch 272, that extends upwardly, and leads to an internal cavity 274, of known volume. Cavity 274 is an air reservoir. During filling of cartridge 100 with a sample to be tested, the liquid mix will flow in lateral leg 264 past the entrance of branch 272. It will tend not to enter branch 272, because branch 272 is blind. It is a cul-de-sac, and static pressure in cavity 274 will tend to keep liquid out. However, when cavity 274 is warmed, the air trapped therein will tend to expand, and, in expanding, will tend to block passageway 262. In this way, air reservoir 274 functions as a pneumatic valve that governs flow in passageway 262 by being operable between a first condition to allow flow, and a second condition that obstructs flow.

Figure 7A:
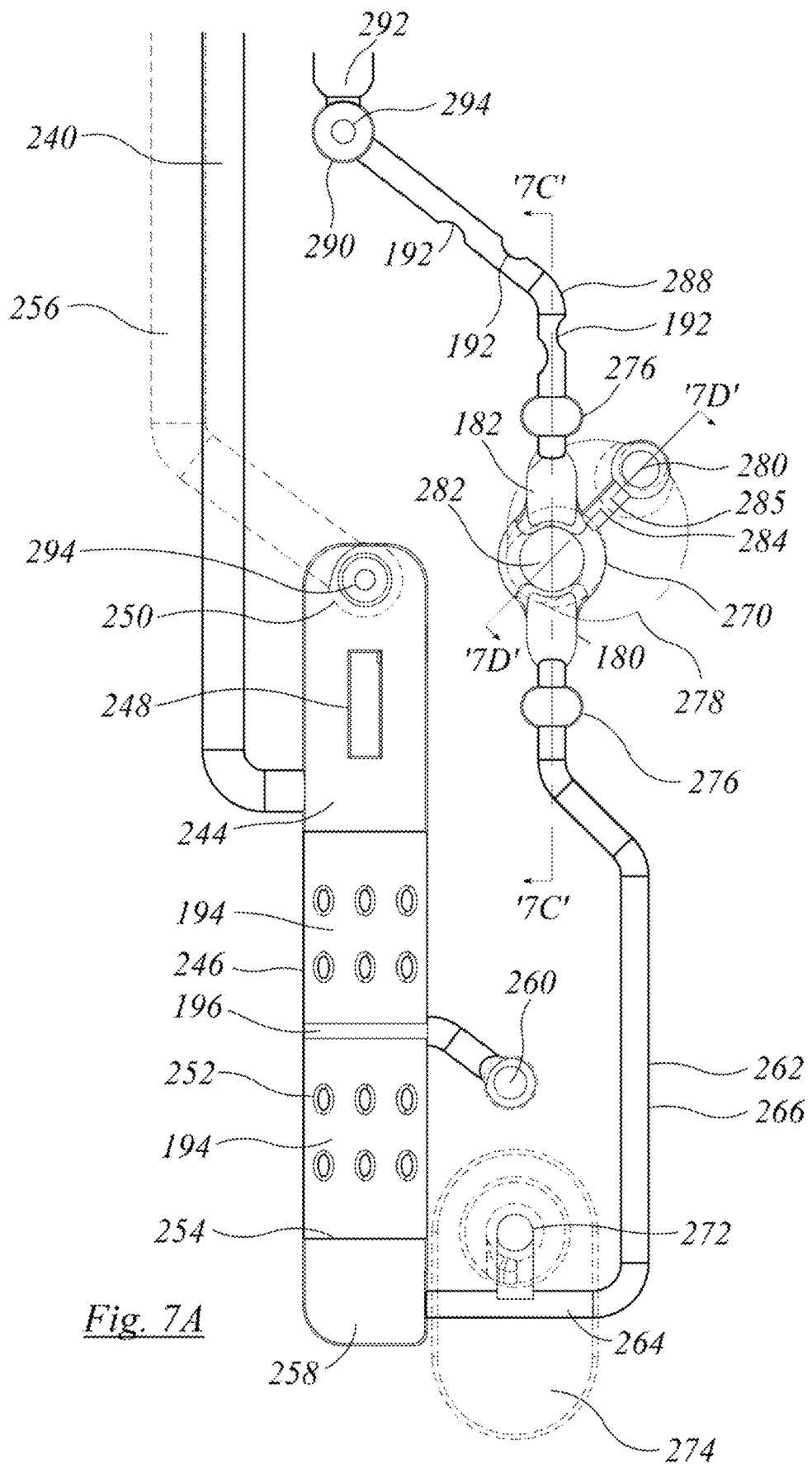
FIG. 7A is an enlarged partial detail view of the cartridge of FIG. 6A.

Third mixing chamber 270 (which may also be termed a "treatment zone", or "second treatment zone") is seen enlarged in FIG. 7A and in section in FIG. 7D. Passageway 262 arrives at an enlarged section or accumulator 276 below the level of mixing chamber 270. Accumulator 276 is of broader section, and causes a slowing. It functions as an antechamber below the entrance of third mixing chamber 270. Mixing chamber 270 has an enlarged portion 278 that has its largest dimension in the plane of back side 212 of body 200, where the passage becomes wider and deeper, as can be seen by comparing the depth of passage 262 in FIG. 7C with the large cross-sectional area of portion 278 in FIGS. 7C and 7D. Mixing chamber 270 has a volume $V_{270}$. Volume $V_{270}$ may be several times larger than volume $V_{242}$ of second well 242. Mixing chamber 270 defines the reactor vessel of the lab-on-a-chip of cartridge 100. There is an adjacent loading port 280, which may be referred to as the third loading port. Loading port 280 forms a passageway from the front side of body 200 into enlarged portion 278. Mixing chamber 270 also has another passageway 282 that, in FIG. 7A, appears to be concentric with enlarged portion 278. Chamber 270 can be considered to be a thermal cycling zone. If enlarged portion 278 is thought of as the boiler or kettle, or reactor vessel of mixing chamber 270, passageway 282, which extends to front face 198 of body 200, can be thought of as the chimney, or flue, or riser pipe. Passageway 282 also defines the viewing pipe, or viewing port, through which the reaction is observed by optical sensor assembly 140. In addition to this viewing pipe, there are two optical illumination passages or pipes, 180, 182 to either side of passageway 282. In operation, pipes 180, 182 are illuminated by optical fiber elements or members 156, and function as optical wave guides that focus on the mid-thickness section of the sample in passageway 282. A lateral passageway 284 is formed in the front face of body 200 between passageway 282 and the passageway defined by loading port 280. In this way, a continuous flow loop 285 is formed so that material heated in enlarged portion 278 can circulate. That is, when cartridge 100 seats in accommodation 96, heat transfer interface portion 318 of covering skin 304 seats next to, and is engaged by, heater 110. Passageway 284, by contrast, is on the opposite side or face of body 200, most distant from heat transfer interface 318. Passageway 284 is accordingly the "cold" side of the loop and interface 318 is the "hot" side at which heated fluid rises. The differential heating on the hot and cold sides creates a convection current, with passageway 284 functioning as, or defining, the re-circulation, or return, of the convection loop where relatively cooler fluid descends. The convection current serves also to cause mixing of the sample and the reagent in chamber 270. Third loading port 280 forms a tube with a first or lower portion 314 and a second or upper portion 316. Lower portion 314 has an inlet taper and upper portion 316 has an outlet taper. They meet at a narrowed waist 286. Upper portion 316 and lateral passageway 284 co-operate to form an elbow shape conduit. A third reagent, or master mix, may be pre-loaded through port 280, into that elbow. Narrowed waist 286 tends to assist in encouraging the master mix to remain in place until mixing is initiated by heating the cooking chamber, or reactor vessel, of enlarged portion 278. That third reagent, $R_3$ has a known or calibrated, or metered, volume $V_{R3}$.

There is another accumulator 276 located at, or above, the upper outlet of mixing chamber 270. It acts as an accumulator or buffer or overflow chamber, or surge tank. It fills after mixing chamber 270 has been filled and that may provide an opportunity for entrained air bubbles to rise and separate. A further passageway 288 extends upwardly beyond and away from third mixing chamber 270. Passageway 288 is effectively an extension of passageway 262 beyond third mixing chamber 270. Passageway 288 is, or leads to, a further escape, or release, or vent 292. Passageway 288 has a series of narrowings, or flow restrictions 192 that may tend to increase flow resistance along passageway 288. A second valve 290 is located along this line. It is convenient for valve 290 to be located where there is an enlargement from passageway 288 to vent 292, which leads to, or includes a main vent collector or chimney, or manifold or channel or passage 296 which exhausts through an output port 298 in upper portion 210 of surface 206. Vent 256 may also discharge into passage 296. As with valve 250, valve 290 is passive. That is, it is reactive to the presence of aqueous liquids, and is self-activating. It could be electronically activated, or it could be in series with an electronically activated valve, but is not electronically activated or controlled in the embodiment shown. That is, it, like the other valve, is passively self-activating. It can be the same as the valve previously described. In the example shown it has an expanding ball or plug 294, as previously described. When the aqueous solution fills third mixing chamber 270, it will continue to flow inward in passageway 262 until it reaches the height of valve 290. As valve 290 self-actuates, it closes the volume of third mixing chamber 270. In each case, the fluid volumes are known. When heating begins, the passive valve function of reservoir 274 prevents back-flow down passageway 262, thus trapping a fixed volume $V_{270}$ of treated solution in the heating zone of third mixing chamber 270.

The various passageways are closed by a set of peelable adhesive films or adhesive sheets 300 that are placed on the front and rear faces of body 200. Whether called a web or membrane, sheet, film or tape there are four such membranes or adhesive sheets 300, being front, upper back, lower back, and top adhesive membranes 302, 304, 306 and 308 respectively, that are applied to the respective front and back faces 198, 212 of body 200. Membranes 302, 304, 306 and 308 are made of a plastic material or film. That material, like body 200, is inert, or non-participating, relative to the substances, samples, and reactions that are found within, or occur within, cartridge 100. Adhesive sheets or adhesive membranes 302, 304, 306 and 308 provide the enclosing walls of the various grooves, channels, and chambers running along or formed in body 200 of cartridge 100, such that enclosed periphery passages or enclosed wells, mixing chambers and so on are formed or completed by the application of those sheets or membranes to the surfaces of body 200.

Front adhesive membrane 302 is rectangular and extends from the bottom edge of the front face of body 200 to line of demarcation 234 between lower portion 208 and upper portion 210 of curved surface 206. The presence of the land that straddles demarcation 234, which may also be termed the mating line, seam line, or parting line, and so on, means the upper edge of first adhesive membrane 302 forms a continuous seal across the unit above input port 230. Upper rear adhesive membrane 304 is also rectangular, or substantially rectangular, and extends from a bottom edge of rear face 212 is above second loading port 260 and well below enlarged portion 278 up to the top rear face 212 of body 200. From that point upward, fourth membrane 308 is applied to follow the curved end face from the upper edge of membrane 304 to of the unit to mating line 234. As applied, the upper edge of sheet 302 abuts the mating folded over edge of sheet 308, such that the openings of the input and exhaust ports and channels of body 200 are closed. As may be noted, membranes 302 and 304 are applied across the upstanding pegs, posts or abutments of first well 224 and second well 242 to form a generally planar surface closing those wells.

The portion of adhesive membrane 304 covering enlarged portion 278 of third mixing chamber 270 also forms the heating base, or heating pad, or bottom, or vertical side-wall, or heat transfer interface 318 of the reactor chamber at which heat is transferred into the reactor vessel, and where the sample mixture is heated and cooled. The portion of adhesive membrane 302 covering passageway 282 also forms the transparent optical interface through which the test sample is observed. Third adhesive membrane 306 covers the lower portion of rear face 212 from the bottom edge up to the mating seam with second membrane 304. First membrane 302 may be provided with a cut-out-or cut-outs, or blanks 310 that locate around third reagent loading port 280, to facilitate the introduction of reagent. Once the reagent has been introduced, the opening may be taped over to re-seal the entrance. Similarly, lower rear sheet 306 may have openings or blanks, or cut-outs 312 formed at the location of second loading port 260. Once loading of the reagent has occurred cut-outs 312 may be taped over to seal the entrance.

FIGS. 8A and 8B establish the positional relationship of cartridge 100 to apparatus 20, generally, when cartridge 100 is positioned for testing of a sample. As can be seen, in the z-direction rear face 212 is placed against heating plate 110. Front face 198 is placed very close to the opposed face of the web of cross-member 58. The clearance is the tolerance clearance that permits shank or lower portion 202 of cartridge 100 to enter into accommodation 96. Optical sensor 154 is aligned in both the x and y directions to look axially into mixing chamber 270. Fiber optic elements 156 are positioned in openings 142, 144 (and 144, 146) to illuminate mixing chamber 270 through optical passages 180, 182. Those light beams are angled relative to the axis of optical sensor 154, and of passageway 282 of mixing chamber 270. That angle may be 45 degrees. The focus of the light beams may be at the mid-plane of cartridge 100. Circuit board 60 is spaced away from cross-member 58 a distance corresponding to the height (in the z-direction) of the optical sensor assembly 140 standing outward between cross-member 58 and circuit board 60. As can be seen, care is taken in establishing dimensional control in each of the x, y and z directions.

Figure 7B:
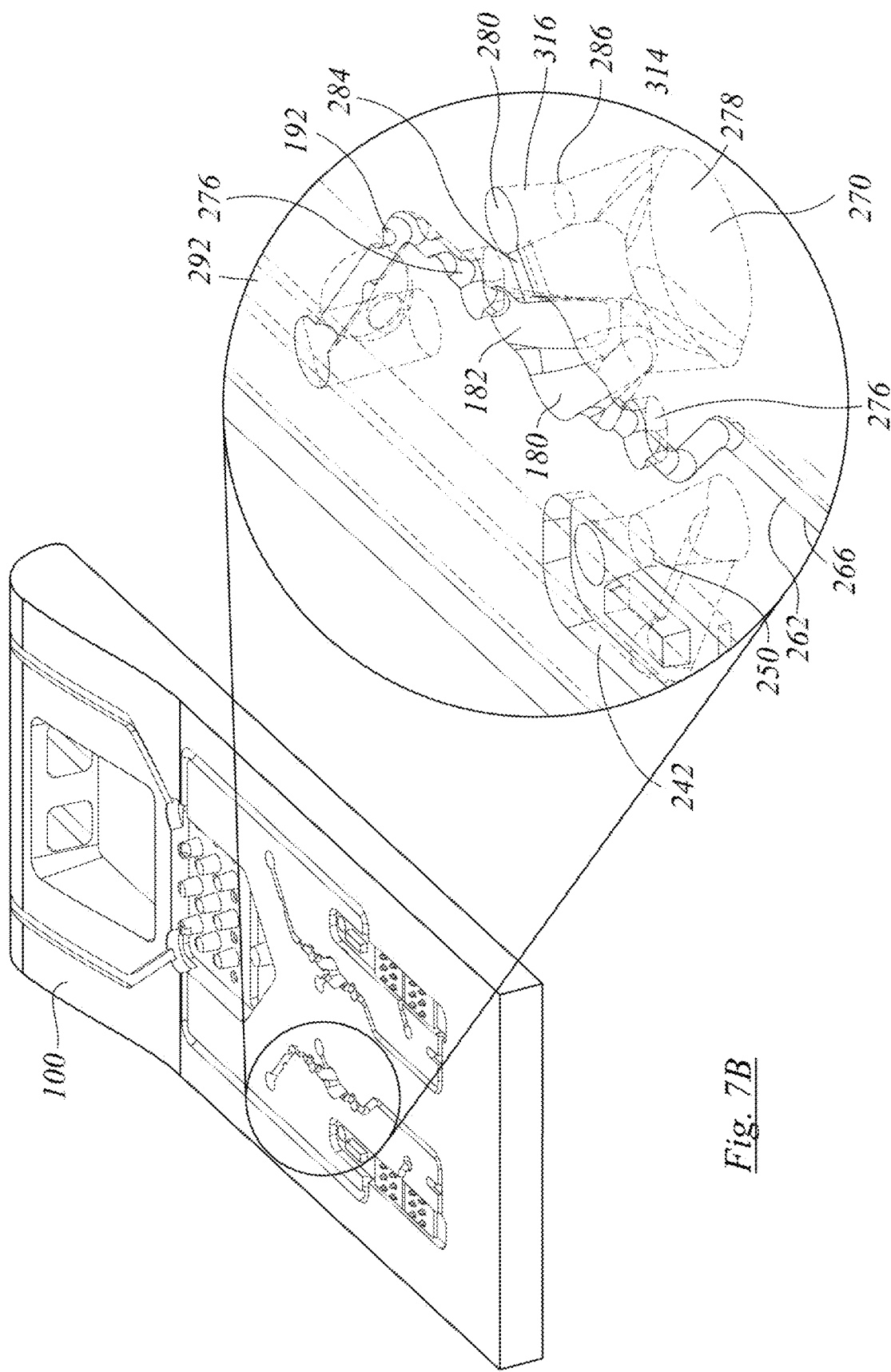
FIG. 7B is another enlarged detail, in perspective, of the reactor chamber of the cartridge of FIG. 6A.

As seen in FIG. 7B, the third reagent can be loaded from the front face 198 of cartridge 100, at the third loading port 280. In some embodiments, the adhesive film or sheet 302 on the front face 198 of cartridge 100 may include a cut-out or removable portion 310, noted above, to maintain access to third loading port 280 after film or sheet 302 is applied. Third loading port 280 is sized to accept a pipette tip. During the loading operation, the third reagent is pipetted through third loading port 280 into the elbow portion defined by the cooperation of lateral passageway 284 and tapered portion 316 of loading port 280, that links the upper portion 282 (or riser, or chimney) and the lower or enlarged portion 278 of the reaction vessel defined by third mixing chamber 270. Narrowed waist 286 at the junction of portions 316 and 314 allows for retention of the third reagent through surface tension (FIGS. 7B, 7C and 7D). In this embodiment, narrowed waist 286 has a 10% taper.

The total volume $V_{R3}$ of reagent $R_3$ is calibrated against the total volume $V_{270}$ of chamber 270 with relation to the mixing ratio of sample to reagent suited to the intended reaction. In this example, third mixing chamber 270 has an approximate total volume of 36 µl and 18 µl of third reagent is loaded, providing an effective dilution of 1:1 when sample is added to the third chamber 270. I.e., the mixture being heated is approximately 50% incoming sample fluid, and 50% reagent $R_3$. The dilution ratio is based on the total volume of chamber 270 plus the downstream wetted channels and bulk filled volume of ball 294.

Cartridge 100 of FIG. 6A and onward is a lab-on-a-chip free of electrical power requirements. It does not have an electrical power connector. It does not have, i.e., it is free of, electrical wiring. It does not have, i.e., is free of, an integral electrical processor or electrical sensors or electrical sending and receiving equipment. This may tend to simplify manufacture and reduce cost. It also avoids reliance on electrical interconnections, multi-pin connectors or plugs, and so on, which may be sources of unreliability.

Once cartridge 100 has been pre-loaded with appropriate reagents, a pipette is inserted at input or inlet 232. Since cartridge 100 is gravity operated, the liquid sample, typically an aqueous solution, flows into cartridge 100 under a gravity head of 2-3 inches of water. The liquid fills the first receiving zone or well 224. It flows through parallel paths through apertures 268 between zones 236 and 238 and encounters the first bank of reagent, where it mixes, for example, with a neutralising reagent, which is referred to as a first reagent. Flow continues until first mixing chamber 224 is full of neutralised sample. As well 224 is being filled, air displaced from well 224 escapes through vent, or vents, 214.

As the liquid level in chamber 224 rises, it reaches the level of the inlet to passage or flow channel 240. Gravity conducts liquid down passage 240 to second mixing chamber or well 242, which begins to fill. The liquid must pass over, encounter, and react with, the second reagent to begin accumulating in sump 258. As liquid starts to fill sump 258 it submerges the inlet of passageway 262, and fills lateral portion 264. As filling continues, liquid fills all of portion 246 of well 242, eventually submerges the outlet of passageway 240, and continues by filling upper portion 244 until liquid solution reaches valve 250. While this occurs, bubbles work their way upward, and air is displaced from well 242 by the liquid solution, and escapes up vent 256 to exhaust manifold 296 and out exhaust port 298. When the liquid reaches valve 250, ball or plug 294 of valve 250 expands, and blocks the passage. That is, valve 290 changes state or position from an open condition to a closed condition.

While well 242 has been filling, the increasing head of fluid causes an outlet flow from sump 258 to flow along lateral leg or portion 264 and up leg 266. The liquid that moves along passageway 262 has all been treated with the second reagent. The height of valve 250 is level with, or slightly above, the level of the inlet of third mixing chamber 270, such that when valve 250 closes, the volume of liquid required to pass through passageway 262 to fill third mixing chamber 270 is known, and the amount of the second reagent can be calibrated accordingly. During this time period, air displaced from passageway 262 vents through valve 290 and out through vent 292 and exhaust manifold 296.

Once valve 250 closes, liquid will continue to fill third mixing chamber 270 under the gravity head present in passageway 240. This filling will continue until third mixing chamber 270 is full, excess fluid has filled the outflow or overflow accumulator 276 and liquid reaches valve 290. When that occurs, ball or plug 294 of valve 290 will expand, and close the passageway. At this point, no further liquid can enter mixing chamber 270, the volume $V_{270}$ of the chamber is known, the volume $V_{R3}$ of the third reagent $R_3$ is known, and the volume of liquid that has passed over, and mixed with, the second reagent $R_2$ is also known because it is limited by the known volumes of the passageways and chambers downstream of chamber 242, so the dilution component concentration of the materials in mixing chamber 270 are known.

In summary, in the first step, the sample is introduced. In the second step, a relatively large amount of liquid is neutralised with a smaller amount of a first reagent. That is, the volume of incoming untreated, raw, sample liquid is large relative to the treating liquid of the first reagent. In the second step, a portion of that relatively large volume mixes with the second reagent. In the third step, a known volume of treated mixture displaces the air from the third well or mixing chamber, and comes into contact with the third reagent. At this point liquid reaches the second valve, expands and stops further inward flow.

The mixed and treated portion of the sample is then to be heated. To prevent the sample from migrating out of third well or mixing chamber 270, which will be the heating chamber, lab-on-chip cartridge 100 has air reservoir 274. As cartridge 100 is heated to a moderate temperature, the air in reservoir 274 expands. As it expands, it closes off passageway 262. Since it cannot flow up passageway 262 into mixing chamber 270 because valve 290 is closed, expanding air from reservoir 274 pushes backward toward well 242 against the liquid head in passageway 240. The volume of reservoir 274 is smaller than the volume of well 242, and the heating is moderate.

The third well or chamber 270 is effectively a combination of a hemispherical cooking pot, elbow, and filling passageway. The filling passageway is closed at one end by valve 290, and at the inlet end by the expanded air that blocks flow through second mixing chamber 242. Thus a loop of fluid is formed. As the mixing pot heats on one side, the liquid in enlarged portion 278 becomes hotter than the liquid in the elbow, and a convection current is established, which mixes the sample with third reagent $R_3$. The act of heating thus drives mixing as well.

As the mixing and heating occurs, the fluorescence of the sample can be observed continuously with optical sensor 154. To that end, apparatus 20 has 45 degree inclined diagonal light ports 142, 144 and an observing port 158 that looks directly into the cooking pot through the junction of the two light beams. As heating progresses, the change in observation can be observed and recorded. The illumination from both sides at 45 degrees as described lights the reaction chamber. The viewing port looks into the reaction chamber and permits optical observation, i.e., sensing, of the reaction chamber as the reaction occurs.

When the plastic module is first produced, it is open on both the back and front sides. The flow channels and the retaining regions for the first and second reagents are of the order of 0.2 mm thick. Thus, with suitable flow channel features and edges, when the reagents are put in place (in a sterile, factory setting) surface tension will hold those reagents in place.

The third reagent may be expensive, and so used in small amounts. It is loaded first, into the elbow of third well 270. Surface tension in the small passageways holds it in place. The first reagent is loaded next. It is loaded almost as a thin film. Once it is in place, a strip of adhesive tape is placed on front side 198 of cartridge 100, closing the chamber.

The second reagent can be loaded at the factory. However, for testing for some types of, e.g., crop disease, shelf life of the second reagent may be much shorter than shelf life of the first and third reagents. Further, where there is more than one crop disease to detect, it may be desirable to be able to select the second reagent from among a number of choices. To that end, cartridge 100 has loading port 280 that is filled with a pipette from the rear side of the module. As above, loading the second reagent displaces air, but that air can vent. The geometry of the retainer space and the posts within it are such that the reagent will stay in place. Once installed, the back of cartridge 100 is also sealed with an adhesive tape.

Further, cartridge 100 fits in slot 96 of apparatus 20 that has the shape of a beverage container, such that it can sit in the drink holder of an automobile to facilitate testing in a non-lab environment. This may permit testing to be done in a farmer's field, or elsewhere, in real time, with the data being analysed while in the field. The observed data, and the results, may be transmitted to from and to the unit electronically and remotely, as may be. The unit includes the heating unit, the sensing unit and a data transmission module, which may include a printed circuit board. The sensing unit includes an illumination source and optical sensors. It is a small, self-contained, field portable unit for lab-on-a-chip testing.

While a single series of chambers is provided, such as may permit a single test, cartridge 100 may have, and as shown does have, more than one (indeed, several) several sets of test chambers, which may be fed by a common inlet or manifold, such as may permit testing to occur for several conditions at one time. That is, multiple patterns of vias, mixing chambers, wells, and observation ports can be provided in a single unit.

The system includes a cartridge 100 into which an aqueous sample is loaded and a reader (sensor assembly 140 and processor 90) that receives cartridge 100 and detects the presence or absence of the analyte in the sample. The result is then indicated to the user, either directly by display array 66 or by data transmission through USB port 64 (or any other electronic data connection) from the reader using a computer or mobile computing device. Examples of direct indication by the reader include the use of a display 66, such as the LED array 68 shown in FIG. 1D, which can indicate to the user a positive result, negative result, inconclusive result, a fault, or other relevant information.

While cartridge 100 and apparatus 20 more generally can be used for testing generally, in one example of a suitable use, cartridge 100 is pre-loaded with reagents to carry out a particular diagnostic assay on the aqueous sample, to detect the presence of the analyte. In this example, the reader (and apparatus 20 more generally), and cartridge 100 are configured to detect the presence of one or more DNA sequences in an aqueous sample using Loop-mediated isothermal amplification (LAMP), in which the presence of a particular DNA analyte is indicated by the presence of an amplification product.

Briefly, in a LAMP assay a DNA sample is incubated with primers and a polymerase with high strand displacement activity. Unlike PCR, a LAMP assay is isothermal and is carried out at a single temperature (e.g. 65° C.). Instead of cycling temperatures to melt the DNA strands, the polymerase itself is responsible for separating the strands of the template DNA. If the target DNA sequence is present in the sample then an amplification product is created, which can be measured by observing the increasing turbidity of the sample (due to magnesium pyrophosphate precipitation) or using a fluorescence-based nucleic acid dye.

Various off-the-shelf kits are available for such LAMP assays. In the present embodiment, cartridge 100 uses the Warmstart™ kit, sold by New England Biolabs, 240 County Road, Ipswich, MA, 01938, along with the SYBR Green™ (Thermofisher Scientific Inc., Waltham MA, USA) fluorescent dye. Other suitable reagents may include EvaGreen™

(Biotium, Inc., Fremont CA, USA) fluorescent dye. The apparatus herein can be used with any aqueous or dry two-part reagent kit.

In the embodiment of FIGS. 5A-8B, first reagent $R_1$ is a neutralization buffer, second reagent $R_2$ is a LAMP primer mix, and third reagent $R_3$ is a master mix for the LAMP reaction plus a fluorescent dye to more easily visualize the amplification product.

As discussed further below, other configurations are also possible in which the LAMP assay is substituted with a Polymerase Chain Reaction (PCR), enzyme-linked immunosorbent assay (ELISA), bead or particle-based assays, or the like. The disclosure is intended to cover all such variants, the suitability of which for a given application and analyte would be understood by the person of skill in view of this disclosure. Many of the fluid mechanics illustrated in the present embodiment would be applicable in such variants.

FIGS. 5A-8B provide detailed views of an embodiment of cartridge 100 that includes a first (224), second (242), and third (270) mixing chamber within which the diagnostic assay is carried out. Cartridge 100 can be manufactured using additive manufacturing or precision injection moulding. Body 200 of cartridge 100 can be produced as a unitary piece, or multiple pieces joined together.

Prior to use, cartridge 100 is pre-loaded with swellable balls or plugs 294 and assay reagents $R_1$, $R_2$ and $R_3$. Adhesive films are then applied to front 198 and back 212 of cartridge 100, thereby closing off the exposed voids to form channels, chambers, and vents. The various reagents do not have to be loaded at the same time. They may have different shelf lives in storage, such that one or another of them may be pre-loaded and stored on a relatively long term (months or years) basis, whereas one or more other reagents may have a short shelf life, and so may need to be loaded relatively soon before use (a few hours or days). The shelf life of any of the reagents may be temperature sensitive, and so pre-loading may depend also on the availability of suitable cooling or refrigeration equipment.

In the example shown in FIGS. 5A-7E, pre-loading begins by laying the cartridge on its rear face 212 and inserting swellable plugs 194 into their corresponding valves 250, 290. An adhesive film 302 is applied to front face 198 of cartridge 100. It is then flipped over to expose rear face 212, at which point the first and second reagents can be loaded. Sheets 306 and 308 can be placed in position.

The first reagent is loaded using however many there may be of inlet, or inlets, 230. Each first loading port 230 is sized to accept a pipette tip or larger device, and the first reagent is deposited as a series of droplets held in the loading ports by surface tension. The total volume of the first reagent is calibrated against the total volume of the first chamber 224. Use of distributed droplets may enhance passive mixing when the sample is added to the first chamber 224; however, other forms of loading (including as a single aliquot) are also contemplated. In this example, the first chamber 224 has an approximate total volume of 300 µl and 15 µl of first reagent is loaded, providing an effective dilution of 20:1 when sample is added to the first chamber 224.

This embodiment also includes a series of optional supports 226, which provide greater rigidity to the adhesive film 302 applied to cartridge 100, over first chamber 224. The inclusion of such supports or stand-offs 226 helps prevent the first reagent from being 'squeezed out' of the first chamber 224, or otherwise being disturbed, due to the flexible nature of the adhesive film. Such supports 226 may also break up the flow of incoming sample as cartridge 100 is loaded, thereby adding to the mechanical mixing of the sample with the first reagent.

Second loading port 260 is also sized to accept a pipette tip. During loading, the second reagent is pipetted through second loading port 260, into a loading channel 196, and is retained in a raised portion 194 within the second chamber 242 using surface tension. The raised portion 194 is elevated (in this example ~1 mm) and has a reduced thickness as compared to relative to the balance of the second chamber 242, which encourages the second reagent to remain within the raised portion 194 due to surface tension. The total volume of second reagent is calibrated against the total volume of the second chamber 242 and against the volume of flow used to fill cartridge 100 more generally and third mixing chamber 270 in particular. In this example, second chamber 242 has an approximate total volume of 9 µl and 8.5 µl of second reagent is loaded, providing an effective dilution of 10:1 when sample is added to the second chamber 242. That is, the dilution ratio of 10:1 is obtained when the sample is added and carries the reagent from chamber 270 into the downstream chambers, and mixes with the remaining reagents in the cartridge. The dilution calculated is specific to the concentration to be realized in chamber 270, and is based upon the total volume of all chambers and flow channels between chamber 242 and valve 294. The concentration is not constant after flow-through, there being an initial high-concentration pulse which is then moderated by subsequent mixing in the expansion of chamber 270. Dilution estimates agree with numerical modelling of the flow network.

This embodiment also includes a series of optional pegs, posts, or stand-offs 252, which provide greater rigidity to the adhesive film applied to front face 198 of cartridge 100, over the second chamber 242. Inclusion of such pegs 252 helps prevent the second reagent from being 'squeezed out' of portion 194 prior to use, due to the flexible nature of the adhesive film.

As seen in FIG. 7B, the third reagent can be loaded from the front face 198 of cartridge 100, at third loading port 280. In some embodiments, adhesive film 302 on front face 198 may include a cutout or removable portion to maintain access to the third loading port 280 after the film is applied. The third loading port 280 is sized to accept a pipette tip. During the loading operation, the third reagent is pipetted through the third loading port 280, into the elbow portion that links the upper portion 282 and upper portion 316.

The total volume of third reagent is calibrated against the total volume of the third chamber 270. In this example, third chamber 270 has an approximate total volume 36 µl and 18 µl of third reagent is loaded, providing an effective dilution of 1:1 when sample is added to the third chamber 270.

Once pre-loading is complete, the rear face 212 of cartridge 100 is closed off with adhesive film and cartridge 100 is either used immediately, or stored as appropriate for the assay for a future use. In the case of assays that depend on enzymes and other temperature-sensitive reagents, such as a LAMP assay, this may require refrigeration or freezing of cartridge 100. If cartridge 100 is stored, the air vents and loading apertures on the top face of cartridge 100 may be sealed with removable tape.

Various other loading sequences may also be used, as appropriate for the application. For example, in some embodiments the second reagent may be responsible for the specificity of the detection assay and so it may be beneficial to load this reagent last, after a customer has placed an order for a particular test.

Likewise, storage of a partially-loaded cartridge can be helpful where one or more reagents (e.g. reagent $R_3$) has a shorter shelf life than the other reagents used in the assay. Upon loading the first two reagents, cartridge 100 can be sealed with the adhesive film. The resulting partially-loaded cartridge can then be stored as appropriate for the assay. Prior to use, the third reagent can then be loaded, through a removable portion of the film.

The orientation of loading ports 230, 260 and 280 and the open ends of the valves 250, 290 can also be varied as appropriate for the application. For example, in one embodiment the swellable plugs 194 and the first reagent are loaded through the rear face 212 of cartridge 100, which is then sealed with adhesive film. Front face 198 of cartridge 100 is then sealed with adhesive film having cut-outs for the second loading port 260 and third loading port 280, which are themselves covered with removable tape. This arrangement can also be reversed, such that the first reagent and the swellable plugs 194 are loaded through the front face 198 and the second and third reagents are loaded through the rear face 212. Various other permutations are also contemplated.

Sample Loading and Mixing

Aqueous samples are prepared in the conventional way for the particular assay used in the system. For embodiments that rely on the LAMP assay, the user begins by mixing the test sample (not shown) in a lysis buffer to release genomic DNA for amplification. In embodiments where the test sample has a strong cellular wall, this may include mechanical agitation. For example, the aqueous sample can be prepared by combining plant material with Triton-X detergent or KOH base in a 2 ml vial containing ball bearings and shaking vigorously for 1 min.

In FIGS. 1A-1E, the user opens lid closure 32 of the reader, i.e., apparatus 20, in the general sense, to reveal a loading tray in the nature of slot 164 that is complementary to the bottom face end or shank 202 of cartridge 100. This provides a convenient resting place for cartridge 100 during the loading operation and maintains cartridge 100 in a vertical, or predominantly upright orientation. The crude sample is then pipetted (or otherwise transferred) from the sample tube into cartridge 100.

The aqueous sample is loaded into cartridge 100 at inlet 232, which can be accessed from its inlet ports at the top of cartridge 100. Inlet 232 leads to first chamber or well 224 in which the sample is reacted with the first reagent, in this case a buffer solution that neutralizes the acid used during the initial extraction step.

As first chamber 224 fills, neutralized aqueous sample rises, and enters the first channel or passageway 140. Optional loading vent 214 is provided at the entrance to first channel 140 to prevent bubbles from blocking flow of liquid through cartridge 100.

First channel 140 leads to second chamber or well 242, in which the neutralized sample is reacted with the second reagent, in this case a LAMP primer mix. Physical contact between the sample and the second reagent, and the hydrostatic head due to gravity breaks the surface tension holding the second reagent in raised portion 194.

As seen in FIG. 6A, first chamber 224 is at a first height ($h_1$) relative to second chamber 242, which provides a gravity head when cartridge 100 is in a vertical or predominantly upright orientation that induces the movement of the sample through cartridge 100. In this embodiment, the first height ($h_1$) is half an inch, which generates a gravity head of approximately 0.02 psi.

As fluid enters second chamber 242, air is displaced through first valve 250. As described it has a first swellable plug 294 made of a material that greatly increases in size when exposed to fluid. In some embodiments, swellable plug 194 is a commercially-available super absorbent polymer (M2 Polymer Technologies, 17N 580 Adams Dr, Dundee Township, Illinois, 60118 placed in the valve 250 during assembly of cartridge 100. It is retained in valve 250 by the adhesive film applied to the front and back of cartridge 100. In its initial condition, swellable plug 294 permits the flow of air through the first valve 250 to first vent 256. The exhausted air ultimately exits at the top of cartridge 100. This facilitates migration of the sample from first chamber 224 to second chamber 242, through first channel 240. On contact with water, first swellable plug 294 increases in diameter (e.g. from 1.9 mm to 7 mm if unconstrained) and obstructs first valve 250, thereby blocking vent 256. Second valve 290 remains open and so the sample continues to migrate through cartridge 100. That is, valve 290 provides a parallel flow path for the fluid, independently of valve 250. Once valve 250 closes (because the head of fluid has reached that height) any remaining sample above that height can only escape by flowing through valve 290, thus gravity on the incoming fluid above that height thereafter drives the filling of chamber 270. It will continue to flow until the entire volume of chamber 270 is filled up to the greater height of valve 290.

Having now been mixed with the first and second reagents, the sample exits second chamber 242 through the second channel 262, under the gravity head. Second channel 262 leads to third mixing chamber 270 where the neutralized and primed sample is reacted with a third reagent. In the example, the third reagent is a master mix containing the enzymes and dyes necessary to carry out the LAMP assay. Physical contact between the sample and the third reagent, and the gravity head in the fluid, overcomes surface tension holding the third reagent in the elbow portion of third chamber 270.

As fluid enters third chamber 270, air is displaced through second valve 290. As seen in FIG. 6A, first chamber 224 is at a second height ($h_2$) relative to second valve 290, and the difference in fluid height encourages movement of the sample upwards through portion 266 of third channel 262 toward second valve 290. In this embodiment, the second height ($h_2$) is approximately half an inch.

Second valve 290 includes a second swellable plug 172, which is made of a material that greatly increases in size when exposed to fluid. In some embodiments, swellable ball or plug 294 is a commercially-available super absorbent polymer, as above. Swellable ball or plug 294 is inserted in second valve 290 during assembly of cartridge 100. In this example it is held in place by the adhesive film applied to front face 198 of cartridge 100. On contact with water, second swellable plug 294 increases in diameter as above, thereby closing second valve 290 and blocking vent 292.

When third chamber 270 fills, swellable ball or plug 294 comes in contact with the aqueous sample and blocks second valve 290. With both valves now closed, the sample can no longer move through cartridge 100.

In some embodiments, movement of the sample in to or out of third chamber 270 is slowed by the inclusion of one or more antechambers 276 in the second channel 262 or third channel 288, or both. Such antechambers may be of greater depth than the adjoining passageways (e.g. 0.1-0.2 mm deeper). Similarly, some embodiments may include one or more indentations or flow restrictors 292 or chokes, on third channel or passageway 288 to delay contact between swellable ball or plug 294 and the third mixture in third chamber 270.

Accordingly, movement of the sample within the cartridge occurs passively under a gravity head, as opposed to requiring the use of an electrical or otherwise powered pump and actively controlled valves. Passive, staged, closure of first valve 250 and second valve 290 controls movement of the sample within cartridge 100, and also meters the volume of flow. This metered volume is used to determine the quantities of reagents to be used. When third mixing chamber 270 is full, and the entrance and exit are closed, the apparatus and sample are ready for analyte detection.

That is the apparatus is a lab-on-a-chip that is largely or entirely self-metering. Passive closure of first and second valves 250 and 290 prevents entry of additional sample into second chamber 242 and third chamber 270, each of which are of a defined volume. This automatic, passive, shut-off feature allows for pre-loading an appropriate amount of second and third reagent to ensure consistency in the detection assay. The valve does not employ electronic control, and neither electronic nor pneumatic power is suppled to force the valve to move to an open or closed position. This largely eliminates the need for active (i.e., external, manual, or programmed and actively sensed) monitoring of the volume of sample applied to first chamber 224, as fluid flow within cartridge 100 will automatically stop when valves 250, 290 have closed. Even if valve 250 remained open, the pressure head in the liquid would cause liquid to rise in both passageway 256 and in third mixing chamber 270 and passageway 288 until valve 290 closed. Once valve 290 closes, third mixing chamber 270 becomes a dead end, even if liquid continues flowing in passageway 256 until it reaches the height of the inlet of passageway 240. Cartridge 100 defines a trap for the flow specimen. Although it has a flow pathway, the pathway does not have, or is not intended to have, and exit for the sample. Rather, there is only venting, or an escape, for the volume of material that is displaced by the sample volume. The fluid in the sample volume need not be a gas. It could be an immiscible liquid relative to aqueous solutions. The gas need not be air. It could be an inert gas, or a non-participating gas. However, the use of air, and its displacement by the aqueous sample and mixtures is simple and convenient, as in the embodiments described. There is an escape for the displaced fluid. The escape closes when the presence of the sample is detected, thus capturing or trapping the mixed solution of the test specimen in the test chamber for treatment, observation, and preservation.

Analyte Detection

Analyte is detected by carrying out the assay and observing the result. In the embodiment shown in FIGS. 5A-8B, the system uses a LAMP assay with a fluorescent dye that absorbs blue light (~470 nm) and emits in the green spectrum (~530 nm) when in the presence of amplified target DNA. As discussed, turbidity measurements can also be used to detect the presence of an amplification product; however, in practice the inventors have thus far found fluorescence to be more sensitive.

In FIGS. 1A to 1E, the reader, i.e., apparatus 20 generally, includes a lid closure 32 202, which can be opened to reveal cartridge slot 164 which gives entry to accommodation 96 for receiving cartridge 100 during the assay. USB port 64 provides charging and data connectivity to electrical components of apparatus 20.

FIGS. 2A to 4E provide further views of the major components of apparatus 20, as escribed above which include a frame 50 for supporting the internal components, cartridge holder 80 for receiving cartridge 100, an integrated circuit board 60 through which the various electronic components are in communication, a power source 70 (in this case, a battery), and a processor 90 for signal processing and communications. Apparatus can be assembled in many configurations. As shown and described, the form apparatus 20 is configured to be hand-held. For example, the reader apparatus 20 of FIGS. 1A to 2G is dimensioned to fit in a standard-sized automotive cup holder. For the purpose of this specification, such a cup holder may be taken to admit cylindrical objects having a diameter of up to 4 inches (10 cm), and in some embodiments up to 3¼ inches (8 cm).

When loaded, cartridge 100 is inserted into cartridge holder 80, which aligns cartridge 100 with the reader 200, in this case with optical sensing assembly 140. That positioning step includes positioning: (a) heating element such as heating plate 110 and heater element 116 over, or in an opposed position relative to the side wall portion of enlarged portion 278 of third chamber 270 (See FIG. 8B) that is defined by covering 304 that closes off the end wall (FIGS. 7D, 8B), and that, defines the heat transfer interface 318 through which heat is received from heater 110; and (b) an optical sensor 154 and LED light sources 156 over, or in opposed location to light wave guides 180 and 182 by which they can illuminate the sample in third chamber 270.

Activation of heater element 116 causes heating of third chamber 270, Heating may occur from room temperature (20 C) to 60-80 C within 2 minutes. For LAMP reaction, the nominal temperature is about 65° C., thereby initiating the LAMP reaction. Variations on the temperature and timing of this heating step may be made as appropriate for the specific LAMP kit or other detection assay used.

Since the amount of third reagent may be small, the structure of third chamber 270 may be configured to encourage the formation of convection currents during the heating step, to encourage thorough mixing of the third reagent with the sample. As described, the elbow portion may be connected to both the upper portion 282 and the lower enlarged portion 278 of third chamber 270. Heating of lower portion 278 tends to cause convective movement of liquid across the narrowed waist 286 in which the third reagent is stored, thereby causing mixing. In this example, the heat imparted by the heating element 116 also causes expansion of air contained within air reservoir 274 to block passageway 262. This prevents egress of the third reagent from third chamber 270 during the LAMP reaction.

In a typical LAMP assay, the presence of target DNA within the sample is indicated by a change in fluorescence, which is driven by a fluorescent green dye which is responsive to DNA. Several such dyes are commercially available, including SYBRGreen™ and EvaGreen™ (Thermofisher Scientific Inc. and Biotium Inc., supra). In the presence of DNA, the dye will absorb blue light at ~470 nm and radiate green light at ~530 nm. That is, in one embodiment it has a long pass filter with a cut-off at 535 nm. Accordingly, fluorescence of the sample indicates the presence of target DNA within the sample.

In the embodiment shown in FIGS. 7A to 7E, the adhesive film or sheet 302 applied to front face 198 of cartridge 100 defines the outer wall of the upper portion of third chamber 270. Preferably, adhesive film or sheet 302 is transparent or includes a transparent window to permit observation of the upper portion of mixing chamber 270.

As seen in the example, reader apparatus 20 includes at least one LED light source of illumination array 130, which emits blue light at a peak of ~470 nm. This blue light is transmitted to the sample in the upper portion of third chamber 270. In this embodiment, light channels 180, 182 are aligned with optical fibers 156 carrying light from the LEDs and assist in the transmission of light into third chamber 270.

Fluorescence of the sample is detected by an optical sensor 172 of optical sensor 154, which in this example includes a filter tuned to 530 nm±10 nm, e.g. a long pass filter with cut-off at 535 nm. Light emitted by the sample at this frequency is detected by the photoelectric optical sensor 172. Signals from sensor 172 are relayed by circuit board 60 to processor 90 for signal processing.

In some embodiments, more than one LED light source 234 is used for each third chamber 270. In one example a sensing LED light source 132 emits light at a peak of ~470 nm and a control LED light source 134 emits light at a peak of ~530 nm. The sensing LED light source 132 is used in the manner described above, to detect the presence or absence of amplified target DNA within the sample.

The control LED light source 134 can be used to diagnose problems with the reader elements of apparatus 20, cartridge 100, or the sample. More specifically, activation of the control LED illumination source 134 may return a signal between a predetermined upper and lower range, which can be determined beforehand through the use of negative controls and pre-programmed in processor 90. A result that falls outside this range may indicate a fault in the optics of the apparatus 20. For example, a test signal using a control LED light source 134 tuned to match a filter on optical sensor 154 should return an expected value within predetermined range before the assay is conducted in third chamber 270.

Mismatches between the sensing LED light source 132 and the control LED light source 134 can indicate a fault in the assay. E.g., if the sensing LED light source 132 returns a high fluorescence value for a LAMP assay, then an uncharacteristically low value for the control LED light source 134 may indicate absence of turbidity in the sample, which should not occur if a significant amplification has occurred. Likewise, if the control light LED source 132 returns a high value, then an uncharacteristically low value for the sensing LED light source 134 may indicate contamination (or improper preparation) of the sample.

Data Processing and Sample Storage

Signals received from the optical sensor(s) 154 are received by the processor 90, which outputs a result (or fault code, if appropriate) for a given third chamber 270 on cartridge 100. Results can be indicated directly or indirectly by the reader. For example, a display array 66, such as an the LED array on the top of cap 32 flashes different light colors in particular combinations to indicate a positive result, a negative result, or a fault code triggered by a control reaction or control LED 134.

Alternatively or in addition, results may be stored in memory by the processor 90 and communicated via a wired or wireless link from the reader of apparatus 20 to a computer or handheld computing device, such as a smartphone or tablet which may be separate from, and may be remote from, apparatus 20. Such links may include (without limitation), Universal Serial Bus cabling, Ethernet cabling, Bluetooth connections, Wifi connections, near field communications, and other popular wired and wireless communications protocols.

After use, cartridge 100 may be stored for further analysis and testing, or for subsequent verification. During storage, closure of first vent 250 and second vent 292 ensures that the sample is retained in third chamber 270 of cartridge 100, rather than exiting from the inlet 230, 232 or out one of the vents.

Moreover, swellable ball or plug 294 continues to absorb sample from third chamber 270 after the assay is complete. Over time, moisture may evaporate from through vent 292 and additional liquid is drawn in from third chamber 270, thereby drawing in any amplified DNA (or other assay products). Swellable ball or plug 294 can be extracted from cartridge 100, stored if need be, and re-tested, if the results of a given field test need to be confirmed for technical or regulatory purposes. Testing has shown even plugs having fully dried out can be ground up and re-tested using electrophoresis or further amplifications in the laboratory. This allows for re-testing where cartridge 100 has otherwise dried out.

In an embodiment, cartridge 100 is also provided with a unique identifier, such as a Radio Frequency Identification (RFID) tag that is read by an antenna mounted in the testing and sample reader apparatus 20. This unique identification is communicated to processor 90, which associates the test result with cartridge 100 in question. Alternatively, or in addition, a bar code or other visible label may also be provided on cartridge 100, as a further identification of the cartridge. Use of a unique identifier on cartridge 100 allows the initial test result for a given cartridge 100 to be stored for future reference. This is particularly helpful where cartridge 100 is retained for possible re-testing after use, but can also be useful in identifying bad batches of reagent and other technical faults with the system.

Assay Configurations

As discussed above, apparatus 20, and cartridge 100, may be configured for assays other than those based on LAMP amplification of genomic DNA. For example, in an embodiment based on the polymerase chain reaction (PCR), heating element 116 is substituted with a Peltier device that can both heat and cool third chamber 270 to permit thermocycling of the sample. The first, second, and third reagents would be replaced with buffer, primers, and a DNA polymerase master mix. Variations on standard PCR, such as Reverse Transcriptase PCR are also contemplated by adjusting the reagents accordingly, using off the shelf kits. Real Time PCR may also be facilitated in some embodiments by adjusting the optical sensor 154 to detect multiple fluorescent reporters.

Variations on LAMP assays may occur within the scope of the invention. For example, Cao et al. (2017) reported a real-time LAMP assay that allows quantitative analysis of the relative amounts of particular target molecules. This may also be accommodated by adjusting the reagents and optical sensor 154 accordingly. Similar advances in the field of LAMP mediated assays are intended to be included within the scope hereof.

Where the assay is based on nucleic acid amplification, single primer sets or multiplexed primer sets may be used. In some examples the second reagent includes multiple primer pairs configured to amplify more than one target DNA molecule. A positive result may therefore indicate the presence of at least one of the target molecules. This can be useful, e.g., where a positive result indicates that one or more species of a particular genus are present. Embodiments employing real time PCR or real time LAMP assays may also be able to differentiate between multiple primer pairs in a multiplex reaction, thereby allowing for multiple target molecules to be detected separately in a single reaction. The apparatus may be used for two-part reactions, where the mix ratio is known or adjusted accordingly.

Assays may also be carried out in parallel. For example, in the example provided cartridge 100 has two paths 220, 222 for the sample to travel after filling chamber 224. Each path leads to its own third chamber 270, which is paired with its own optical sensor 154 and LEDs of illumination sources 130. Third, fourth, and higher paths may also be provided as permitted by the size constraints of cartridge 100, to suit a given application.

The ability to run assays in parallel provides flexibility in the experimental design of cartridge 100. For example, tests can be run in duplicate to increase confidence in the result, different primers can be used in each path to test for different target analytes, or controls (positive or negative) can be added to detect faults.

To recap, this description relates to a portable test cartridge processor or test cartridge reader, or reaction assembly, and a test cartridge for use with that processor, reader, or reaction assembly.

As described, the cartridge has a reaction chamber where mixing of the test solution and a processing reagent is driven by heating to cause a convection current in the solution. To that end, the treatment zone has a recirculation loop. One side of the loop is heated. The other side of the loop is more distant from the heater or the heat transfer interface, and so the differential heating and cooling drives convection flow in the mixture. As also described, the volumes of the various chambers, or zones, and the amounts of volumes of the reagents is set to provide a self-metering function by which the sample and the various reagents combine and mix in proportions appropriate for the test being conducted.

The cartridge is passive. That is, the various passageways, chambers, and vents are arranged in a gravitational hierarchy such that when the aqueous sample is introduced it flows through the passageways and chambers in a gravity-driven order. The separation of bubbles, the escape of displaced gases (i.e., air) also occurs due to the different densities of liquids and gases and is a gravity-driven separation process.

The cartridge has a cartridge body. It has at least a first processing pathway formed in the cartridge body. It may have more passageways, such as if multiple tests are to be conducted at one time. The processing pathway has an inlet, and at least a first treatment zone, i.e., that of chamber 242, in which to combine an input specimen solution and a particular reagent. The particular reagent ($R_2$, above) has a known volume, $V_P$ ($V_{R2}$, above). The processing pathway has a second treatment zone, i.e., that of chamber 270, downstream of the first treatment zone. The second treatment zone has a known volume, $V_Z$; ($V_{270}$, above). The second treatment zone has a processing reagent ($R_3$, above) loaded therein, the processing reagent has a known volume $V_R$ ($V_{R3}$, above). The second treatment zone has a vent, 292. The vent has a self-actuating valve 290. It has a first state in which the self-actuating valve permits a first substance to leave the second treatment zone through vent 292. It has a second state in which the self-actuating valve obstructs flow through vent 292. The self-actuating valve is convertible from the first state to the second state in the presence of a test specimen. The known proportions of the volumes function to self-meter incoming aqueous sample fluid relative to the particular reagent and the processing reagent.

As indicated, the first treatment zone has a known volume. The cartridge is pre-loaded with particular reagent and processing reagent. The particular reagent has a volume $V_P$ that is less than $V_R$. Vent 292 is a first vent. Test cartridge 100 has an inlet well 224 upstream of the first treatment zone. There is a second vent 250 connected to the first treatment zone 242. Vent 250 is operable to close before vent 292. That is, being a gravity-driven device, vent 250 is operable to close at a liquid level lower than the second treatment zone of chamber 270. There is a buffer chemical pre-loaded in well 224 upstream of the first treatment zone of chamber 242. The second treatment zone has a heat transfer interface 318, namely outside wall of enlarged portion 278 of chamber 270 through which, in processing, heat flows from heater 110 to treat materials in the second treatment zone. The second treatment zone has a flow loop that includes a recirculation passage, 284, and that portion of the flow loop is distant from heat transfer interface 318. Cartridge 100 has (a) an optical port through which to observe the second treatment zone; and (b) a lighting port through which to illuminate at least a portion of the second treatment zone. The volumes of the first treatment zone, the particular reagent, and the processing reagent are co-ordinated to provide a self-metering function with respect to a sample specimen introduced to the cartridge.

In another way of looking at test cartridge 100, cartridge body 200 has a first processing pathway formed therein. The processing pathway has an inlet, and at least a treatment zone, that of chamber 270, in which to process an input specimen solution and a particular reagent. The treatment zone has a heat transfer interface 318 through which to introduce heating from an external source, heater 110, into the treatment zone. The treatment zone has a flow loop that includes a recirculation passage 284. Heat transfer interface 318 forms a portion of an external wall 304 of cartridge 100 and recirculation passage is 284 distant from heat transfer interface 318. Cartridge 100 has an optical port through which to observe at least a portion of the second treatment zone, and a lighting port through which to illuminate at least a portion of the treatment zone. It has a self-activating valve 290 that traps specimen material in the test chamber 270. The test cartridge has a pneumatic thermal lock operable to obstruct egress of test sample from the treatment zone during treatment.

As before, a first treatment zone defined by chamber 242, upstream of the second treatment zone, that of chamber 270. Cartridge 100 has a specific amount of a particular reagent $R_2$ pre-loaded in the first treatment zone 242 and a second specific amount a processing reagent $R_3$ pre-loaded in the second treatment zone 270. The first treatment zone, second treatment zone, and the amounts of the particular reagent and the processing reagent are co-ordinated to provide a self-metering function in respect of a specimen sample introduced to the cartridge. As before, test cartridge 100 has fluidic flow passages arranged in a gravity-driven hierarchy. Test cartridge 100 has peelable accessways covering to permit at least one of (a) at least one pre-loaded reagent; and (b) an aqueous test solution.

The system can be seen as a whole that includes both a portable test cartridge reader and a test cartridge. The test cartridge reader has an accommodation 96 in which removably to receive test cartridge 100; a heater; illumination sources; and optical sensors. Cartridge 100 has an internal passageway has an inlet and at least one treatment zone. The treatment zone includes at least heat transfer interface 318 that, when the test cartridge is seated in the accommodation, co-operates with heater 110. The test cartridge has a first optical illumination port that, in use, is positioned to expose the treatment zone to light from the first illumination source. The test cartridge has optical observation ports through which, in use, the optical sensors are exposed to the treatment zone. The treatment zone has a passageway defining a recirculation loop. A first portion of the loop is heated through the heat transfer interface and a second portion of the loop is located away from the heat transfer interface. During treatment the process of differential heating of the first and second portions drives convection heating of material in the treatment zone. The test cartridge has self-actuating valving operable to trap treatment material in the treatment zone. The test cartridge has a fluidic circuit formed therein according to a gravitational hierarchy. The treatment zone has a specific volume, and the cartridge is provided with a processing reagent that has a volume that is a specific proportion of the volume of the treatment zone. The volume of the treatment zone functions as a self-metering limit governing metering of input specimen volume relative to processing reagent volume.

There is another, first, treatment zone upstream of the second treatment zone. A particular reagent is pre-loaded in the second treatment zone and at least one of (a) the second treatment zone; and (b) the particular reagent, is provided in a specific volume relative to volume of the first treatment zone. The test cartridge has an entry chamber at which to receive an aqueous test sample. The entry chamber is upstream of the treatment zone, and the entry chamber is pre-provided with a buffer chemical.

The portable test cartridge reader has a base sized to fit within an automobile cup holder socket. The test cartridge reader includes a processor, a rechargeable battery, an electric heating element of the heater, and an electrical connection; the processor is connected to control operation of the heater, to monitor at least the first optical sensor, and to store and transmit test results; and the electrical connection is operable to charge the battery and to provide a communications path for at least output from the processor.

The embodiments of the present disclosure are intended to be examples only. Alterations, modifications and variations may be made to the particular embodiments without departing from the intended scope of the present application. In particular, features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole. The subject matter described herein and in the recited claims intends to cover and embrace all suitable changes in technology.

Various embodiments have been described in detail. Since changes in and or additions to the above-described examples may be made without departing from the nature, spirit or scope of the invention, the invention is not to be limited to those details but only in by a purposive construction of the claims as required by law.

I claim:

1. A test cartridge in which to test an aqueous sample fluid, comprising:
   a cartridge body;
   at least a first processing pathway formed in said cartridge body;
   said processing pathway including an inlet, and at least a first treatment zone in which to combine an input specimen of the aqueous sample fluid and a particular reagent;
   said particular reagent having a known volume, $V_{R1}$;
   said processing pathway including a second treatment zone downstream of said first treatment zone;
   said second treatment zone having a known volume, $V_Z$;
   said second treatment zone having a processing reagent loaded therein, said processing reagent having a known volume $V_{R2}$; and
   said known volumes provide self-metering with respect to the input specimen of the incoming aqueous sample fluid relative to said particular reagent and said processing reagent.

2. The test cartridge of claim 1 wherein:
   said second treatment zone has a vent;
   said vent has a self-actuating valve;
   said self-actuating valve has a first state in which said self-actuating valve permits a first substance to leave said second treatment zone through said vent;
   said self-actuating valve has a second state obstructing flow through said vent to prevent escape of material from said second treatment zone; and
   said self-actuating valve being convertible from said first state to said second state in the presence of the aqueous sample fluid.

3. The test cartridge of claim 1 wherein said first treatment zone has a known volume.

4. The test cartridge of claim 1 wherein said cartridge is pre-loaded with said particular reagent and said processing reagent, and $V_{R2}$ is less than $V_{R1}$.

5. The test cartridge of claim 2 wherein said vent is a first vent; said test cartridge includes an inlet well upstream of said first treatment zone; there is a second vent connected to said first treatment zone; and said second vent is operable to close at a liquid level lower than said second treatment zone.

6. The test cartridge of claim 5 wherein there is a buffer chemical pre-loaded in said well upstream of said first treatment zone.

7. The test cartridge of claim 1 wherein said second treatment zone has a heat transfer interface through which, in processing, heat flows to treat the input specimen of the aqueous sample fluid in said second treatment zone.

8. The test cartridge of claim 1 wherein said second treatment zone has a flow loop that includes a recirculation passage, and said flow loop is distant from said heat transfer interface.

9. The test cartridge of claim 1 wherein said cartridge has at least one of: (a) an optical port through which to observe at least a portion of said second treatment zone; and (b) at least one lighting port through which to illuminate at least a portion of said second treatment zone.

10. The test cartridge of claim 1 wherein said volumes of at least said first treatment zone, said particular reagent, and said processing reagent are known, and the respective volumes of said particular reagent and the processing reagent are chosen to provide self-metering with respect to a sample specimen of the aqueous sample fluid introduced to said cartridge.

11. A test cartridge comprising:
    a cartridge body;
    at least a first processing pathway formed in said cartridge body;
    said processing pathway including an inlet, and at least a treatment zone in which to process an input specimen solution and a particular reagent;
    said treatment zone having a heat transfer interface through which to introduce heating from an external source into said treatment zone; and
    said treatment zone has a flow loop that includes a recirculation passage.

12. The test cartridge of claim 11 wherein said heat transfer interface forms at least a portion of an external wall of said cartridge body and said recirculation passage is distant from said heat transfer interface.

13. The test cartridge of claim 11 wherein said cartridge has an optical port through which to observe at least a portion of said second treatment zone.

14. The test cartridge of claim 11 wherein said cartridge has at least one lighting port through which to illuminate at least a portion of said treatment zone.

15. The test cartridge of claim 11 wherein said processing pathway of said test cartridge has at least one self-activating valve that is operable to trap input specimen solution in said treatment zone.

16. The test cartridge of claim 11 wherein said test cartridge has a pneumatic thermal lock operable to obstruct egress of a test sample from said treatment zone during treatment.

17. The test cartridge of claim 11 wherein said treatment zone is a second treatment zone, said cartridge has a first treatment zone upstream of said second treatment zone, said cartridge has a specific amount of a particular reagent pre-loaded in said first treatment zone and a second specific amount a processing reagent pre-loaded in said second treatment zone, said first treatment zone, second treatment zone, and said amounts of said particular reagent and said processing reagent are co-ordinated to provide a self-metering function in respect of a specimen sample introduced to said cartridge.

18. The test cartridge of claim 11 wherein said first processing pathway of said test cartridge body has fluidic flow passages arranged in a gravity-driven hierarchy.

19. The test cartridge of claim 11 wherein said cartridge body has at least one peelable accessway covering of said processing pathway to permit introduction of at least one of (a) at least one pre-loaded reagent defining said particular reagent; and (b) an aqueous test solution defining the input specimen solution.

20. A test cartridge comprising:
   a cartridge body;
   at least a first processing pathway formed in said cartridge body;
   said processing pathway including an inlet, and at least a treatment zone in which to process an input specimen solution and a particular reagent;
   said treatment zone having a heat transfer interface through which to introduce heating from an external source into said treatment zone; and
   said first processing pathway has at least one self-activating valve that is operable to trap input specimen solution in said treatment zone.

21. A test cartridge in which to test an aqueous sample fluid, comprising:
   a cartridge body;
   at least a first processing pathway formed in said cartridge body;
   said processing pathway including an inlet, and at least a first treatment zone in which to combine an input specimen of the aqueous sample fluid and a particular reagent;
   said processing pathway including a second treatment zone downstream of said first treatment zone;
   said second treatment zone has a vent;
   said vent has a self-actuating valve;
   said self-actuating valve has a first state in which said self-actuating valve permits a first substance to leave said second treatment zone through said vent;
   said self-actuating valve has a second state obstructing flow through said vent to prevent escape of material from said second treatment zone; and
   said self-actuating valve being convertible from said first state to said second state in the presence of the aqueous sample fluid.

22. The test cartridge of claim 21 wherein said vent is a first vent; said test cartridge includes an inlet well upstream of said first treatment zone; there is a second vent connected to said first treatment zone; and said second vent is operable to close at a liquid level lower than said second treatment zone.

23. A test cartridge in which to test an aqueous sample fluid, comprising:
   a cartridge body;
   at least a first processing pathway formed in said cartridge body;
   said processing pathway including an inlet, and at least a first treatment zone in which to combine an input specimen of the aqueous sample fluid and a particular reagent;
   said processing pathway including a second treatment zone downstream of said first treatment zone;
   said second treatment zone having a processing reagent loaded therein; and
   said second treatment zone has a heat transfer interface through which, in processing, heat flows to treat the input specimen of the aqueous sample fluid in said second treatment zone.

\* \* \* \* \*